(12) United States Patent
Ezaki et al.

(10) Patent No.: US 7,810,473 B2
(45) Date of Patent: Oct. 12, 2010

(54) CONTROL DEVICE AND METHOD FOR INTERNAL COMBUSTION ENGINE

(75) Inventors: Shuichi Ezaki, Susono (JP); Akio Kidooka, Ashigarakami-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 211 days.

(21) Appl. No.: 11/990,510

(22) PCT Filed: Sep. 19, 2006

(86) PCT No.: PCT/IB2006/002592

§ 371 (c)(1),
(2), (4) Date: Feb. 15, 2008

(87) PCT Pub. No.: WO2007/042876

PCT Pub. Date: Apr. 19, 2007

(65) Prior Publication Data

US 2009/0120390 A1    May 14, 2009

(30) Foreign Application Priority Data

Oct. 12, 2005    (JP)    ............................. 2005-297933

(51) Int. Cl.
*F02D 7/00*    (2006.01)
(52) U.S. Cl. .................... 123/481; 123/198 F
(58) Field of Classification Search ................. 123/481, 123/198 F, 198 DB, 323
See application file for complete search history.

(56) References Cited

U.S. PATENT DOCUMENTS

| 5,337,720 A | 8/1994 | Murakami et al. |
| 5,558,051 A | 9/1996 | Yoshioka |
| 6,526,745 B1 * | 3/2003 | Ogiso ........................... 60/285 |
| 2005/0045156 A1 * | 3/2005 | Yokoi et al. ................. 123/481 |

FOREIGN PATENT DOCUMENTS

| EP | 1 111 220 A2 | 6/2001 |
| EP | 1 426 593 A2 | 6/2004 |
| JP | 55-072621 A | 5/1980 |
| JP | 2001-182570 A | 7/2001 |
| JP | 2004-137969 A | 5/2004 |
| JP | 2004-143990 A | 5/2004 |
| JP | 2004-169646 A | 6/2004 |
| JP | 2004-308487 A | 11/2004 |

* cited by examiner

*Primary Examiner*—Stephen K Cronin
*Assistant Examiner*—Raza Najmuddin
(74) *Attorney, Agent, or Firm*—Kenyon & Kenyon LLP

(57) ABSTRACT

This control device for an internal combustion engine includes a variable intake valve device and a variable exhaust valve device; and it performs fuel cut-off for a plurality of cylinders of the internal combustion engine. And it further includes: an intake valve control means which, when the fuel cut-off execution condition has come into effect, controls the variable intake valve device, so as to keep in a closed state the intake valve of a cylinder, for which an exhaust valve is not kept in a closed state; and an exhaust valve control means which, when the fuel cut-off execution condition has come into effect, controls the variable exhaust valve device, so as to keep in an open state an exhaust valve of at least a pair of cylinders, between which gases in the pair of cylinders come and go via an exhaust passage as the pistons operate.

10 Claims, 17 Drawing Sheets

F I G . 8A
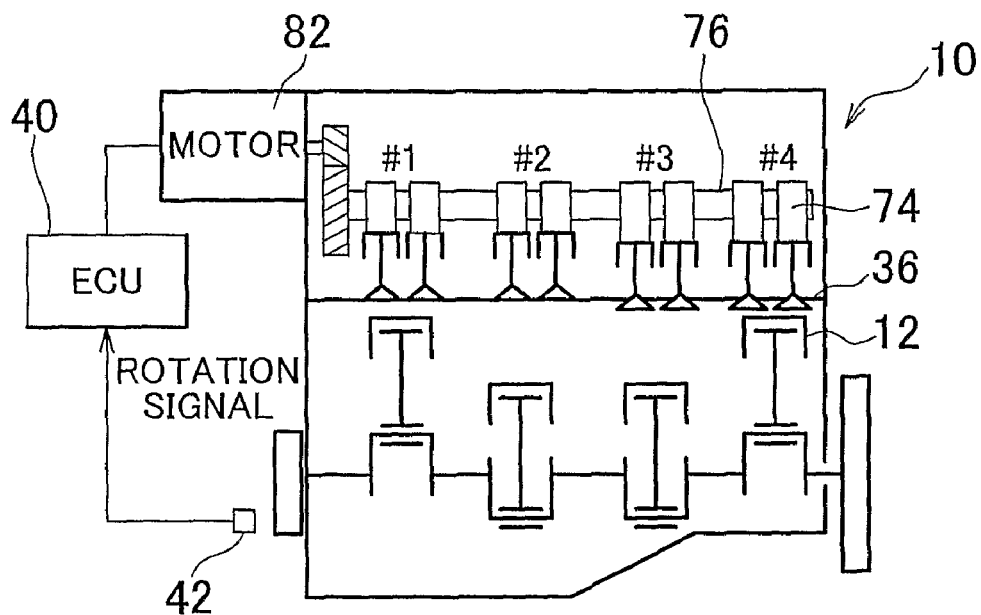
F I G . 8B
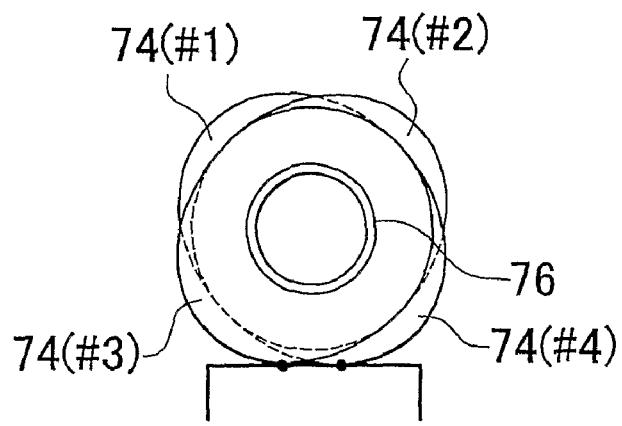

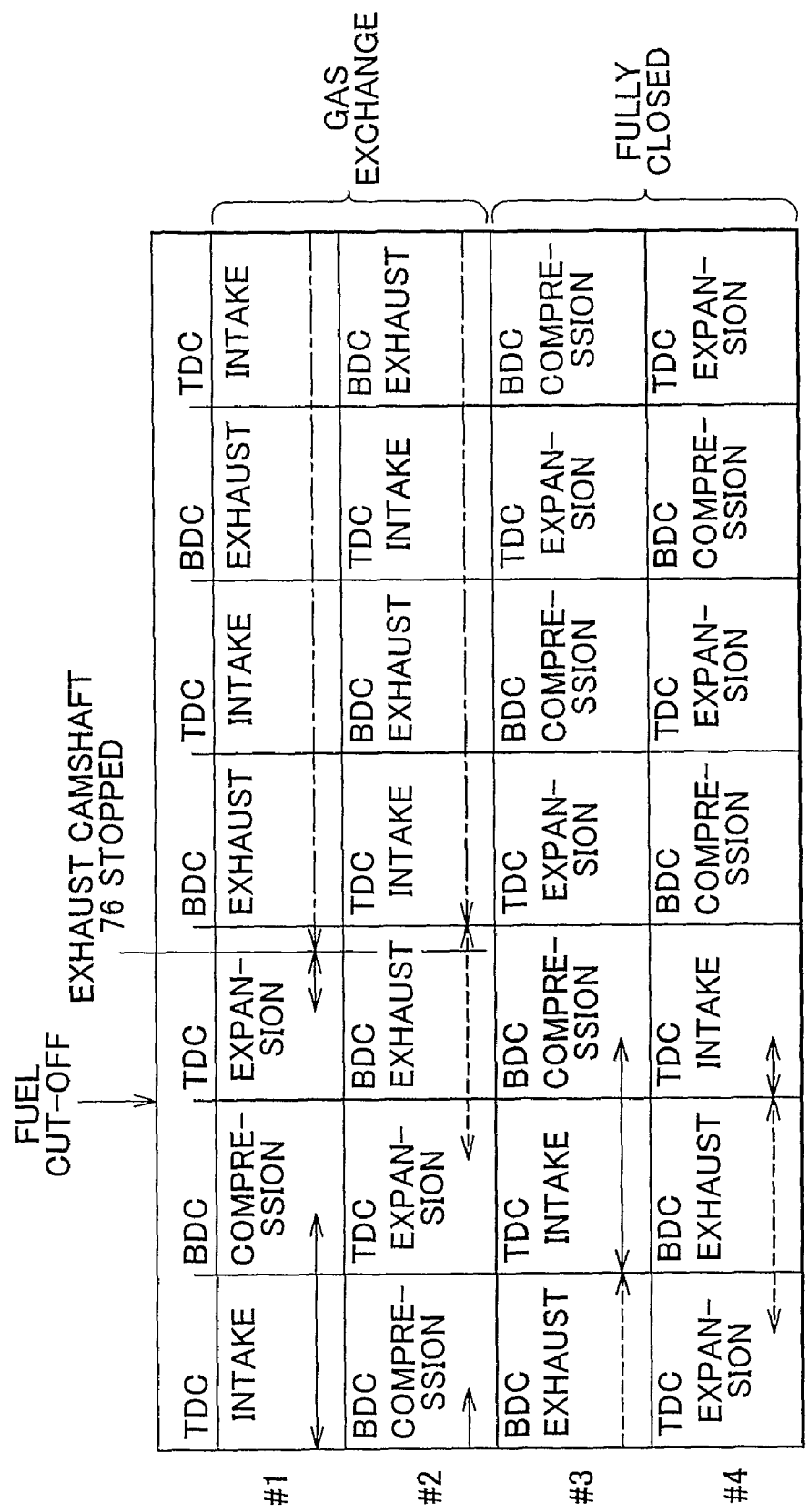

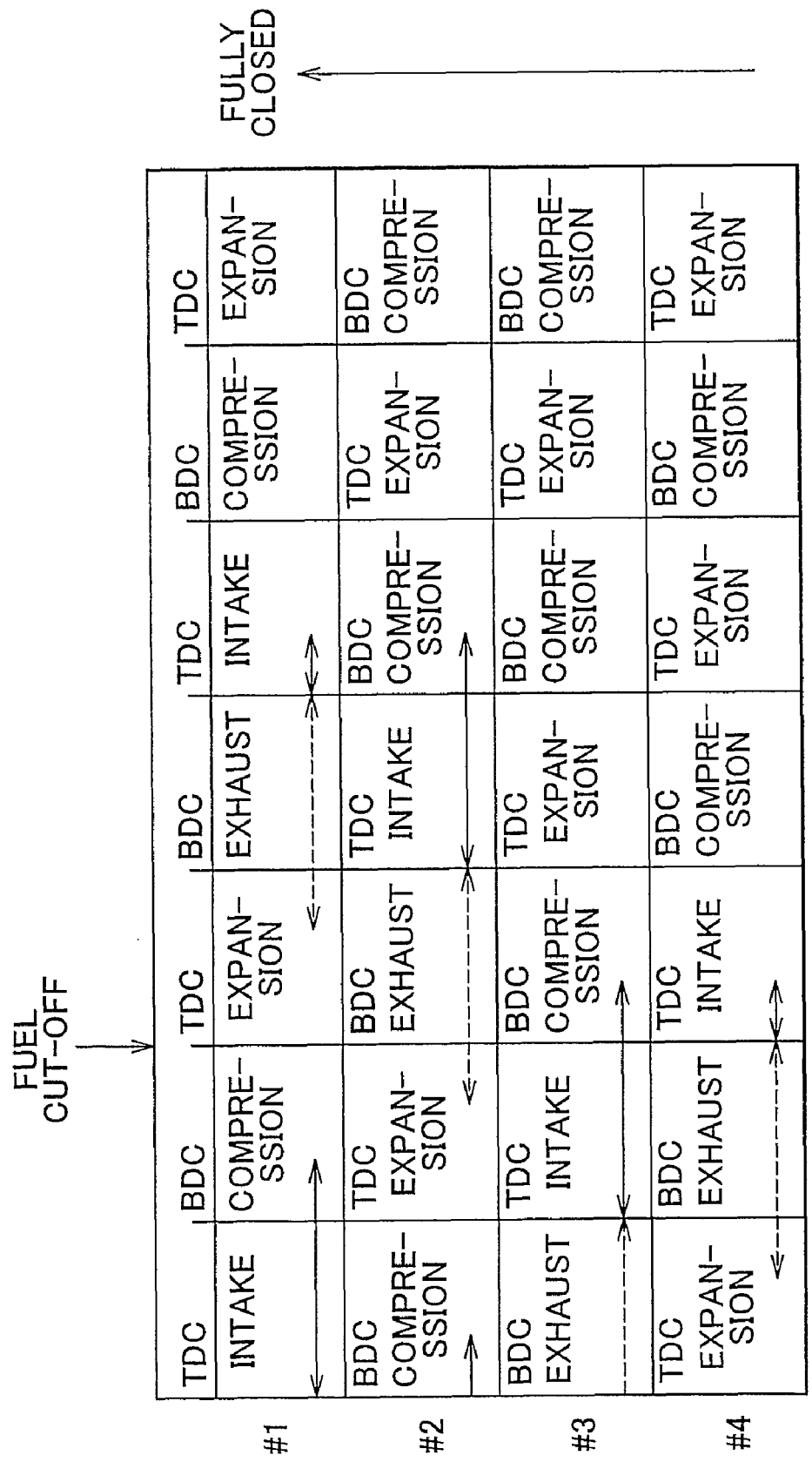

CONTROL DEVICE AND METHOD FOR INTERNAL COMBUSTION ENGINE

This is a 371 national phase application of PCT/IB2006/002592 filed 19 Sep. 2006, claiming priority to Japanese Patent Application No. 2005-297933 filed 12 Oct. 2005, the contents of which are incorporated herein by reference.

BACKGROUND OF THE INVENTION

1. Field of the Invention

The present invention relates to a control device and method for an internal combustion engine, and in particular relates to a control device and method for controlling an internal combustion engine which is equipped with a variable valve operation device capable of varying the opening characteristics of the valves.

2. Description of the Related Art

In Japanese Patent Laid-Open Publication 2004-143990, there is disclosed a control device for an internal combustion engine, equipped with a valve operating mechanism which is built so as to make it possible to suspend the valve opening operation of the intake valves and the exhaust valves. With this control device, in order to prevent deterioration of the catalyst due to flow-through of air when the fuel is cut off, it is arranged to suspend the valve opening operation (i.e. to keep in a closed state) of at least one of the intake valve and the exhaust valve of a plurality of cylinders.

Furthermore, with this control device, it may be arranged to suspend the valve opening operation of one only of the intake valve and the exhaust valve of a plurality of cylinders; and thereby the beneficial effect of engine braking is obtained by creating pumping loss. According to this type of control, although sometimes, when the fuel is cut off, the operation of one of the intake valves and the exhaust valves is suspended with a view to preventing deterioration of the catalyst, nevertheless it is still possible to keep the beneficial effect of engine braking, so that it is possible to obtain a feeling of deceleration.

The operational timings of the pistons in the engine cylinders are relatively different from one another, and depend upon factors such as the number of cylinders, the type of the engine (whether it is an in-line type engine or a V-type engine), the firing intervals between the various cylinders, and so on. Accordingly in order effectively, during fuel cut-off, to prevent flow-through of air to the catalyst while still ensuring engine braking, it is desirable to select, from among the plurality of cylinders, those cylinders for which the valve opening operation of the valves must be suspended, in consideration of the fact that the operational timings of the pistons are different for the different cylinders. No attention is paid to this matter with the above described control device, and accordingly there still remains unexplored scope for research with regard to implementation of a system for, during fuel cut-off, effectively preventing flow-through of air to the catalyst, while also ensuring good engine braking.

SUMMARY OF THE INVENTION

It is an object of the present invention to provide a control device and method for an internal combustion engine, which, while ensuring desired engine braking when the fuel is cut off, also effectively suppress deterioration of the catalyst.

A first aspect of the present invention relates to a control device for an internal combustion engine which includes a variable intake valve operation device which can stop the opening operation of an intake valve, a variable exhaust valve operation device which can stop the opening operation of an exhaust valve; an internal combustion engine control device, and which, when a fuel cut-off execution condition has come into effect, performs fuel cut-off for a plurality of cylinders of the internal combustion engine. The control device includes an intake valve control means which, when the fuel cut-off execution condition has come into effect, controls the variable intake valve operation device so as to keep in a closed state at least an intake valve of a cylinder, for which an exhaust valve is not kept in a closed state, and an exhaust valve control means which, when the fuel cut-off execution condition has come into effect, controls the variable exhaust valve operation device so as so as to keep in an open state an exhaust valve of at least a pair of cylinders, between which gases in pistons in the pair of cylinders come and go via an exhaust passage as the pistons operate.

According to the control device of the first aspect, by utilizing at least the pair of cylinders between which gases come and go via the exhaust passage, and by performing gas exchange between at least this pair of cylinders, it becomes possible, during fuel cut-off, effectively to generate pumping loss, while suppressing the flow of air out to a catalyst. Due to this, according to the present invention, during fuel cut-off, it is possible effectively to suppress deterioration of the catalyst, while still ensuring a desirable level of engine braking.

Furthermore it would also be acceptable, when the fuel cut-off execution condition has come into effect, for the variable exhaust valve operation device to keep the exhaust valves of all of the cylinders, other than the aforementioned at least a pair of cylinders, in a closed state.

According to this specialization, for those cylinders other than the above described at least a pair of cylinders, it is possible to anticipate a reduction of pumping loss during fuel cut-off.

Furthermore it would also be acceptable, when the fuel cut-off execution condition has come into effect, for the variable exhaust valve operation device to keep the intake valves of all of the cylinders of the engine in a closed state.

According to this specialization, for those cylinders other than the above described at least a pair of cylinders, it is possible to anticipate a reduction of pumping loss during fuel cut-off.

Furthermore it would also be acceptable for the variable exhaust valve operation device to be used in common for a plurality of cylinders, and to include an exhaust camshaft including exhaust cams which put the exhaust valves of the at least a pair of cylinders in an open state, and a drive means which drives the exhaust camshaft; and for the drive means to be capable of stopping the exhaust camshaft in a state in which the exhaust valves of the at least a pair of cylinders are in an open state.

According to this specialization it is possible, by utilizing a variable exhaust valve operation device of a simplified structure in which a plurality of cylinders have a common exhaust camshaft, effectively to suppress deterioration of the catalyst during fuel cut-off, while still ensuring a desirable level of engine braking.

Furthermore it would also be acceptable, for the intake valve control means or the exhaust valve control means to close, after the execution condition has come into effect, one of an intake valve and an exhaust valve of at least one cylinder whose intake and exhaust valves are fully closed during fuel cut-off, when the piston for the cylinder is at an approximately intermediate position between its top dead center and its bottom dead center.

According to this specialization, when strokes which alternatingly compress and expand the gas within the combustion chambers are repeated during the execution of fuel cut-off, it is possible to ensure that the gas pressure (the amount of charged gas) within the combustion chambers at the time of closing of the intake and exhaust valves is appropriate, so that it becomes possible to suppress the peak value of the working amount of the crankshaft to the minimum limit.

Furthermore it would also be acceptable for the exhaust valve control means to include a cylinder detection means which, at the time point at which the fuel cut-off execution condition has come into effect, detects at least a pair of cylinders which are not their intake stroke or compression stroke; and for the exhaust valve control means to control the variable exhaust valve operation device so as to keep in an open state an exhaust valve of each of the at least a pair of cylinders which have been detected.

According to this specialization, it is possible reliably further to suppress the flowing out of air to the catalyst, after the execution condition for fuel cut-off has come into force.

Furthermore it would also be acceptable for there to be further included: an engine temperature detection means which detects the temperature state of the internal combustion engine; a start request detection means which detects a start request for starting the internal combustion engine; and a warm-start means which, when the combustion start request is detected during the internal combustion engine being in a warm state, starts combustion from a cylinder, an exhaust valve of which is in an open state.

According to this specialization, when the start request has been issued when the engine is warm, it is possible to suppress undue elevation of the compression temperature of the cylinder at which combustion is started, so that it is possible to prevent the occurrence of knocking.

Furthermore it would also be acceptable for there to be further included: an engine temperature detection means which detects the temperature state of the internal combustion engine; a start request detection means which detects a start request for starting the internal combustion engine; and a cool-start means which, when the combustion start request is detected during the internal combustion engine being in a cool state, starts combustion from a cylinder, both an intake valve of which and an exhaust valve of which are in a closed state.

According to this specialization, when a start request has been issued when the engine is cool, it is possible to start the combustion after having elevated the compression temperature of the cylinder at which combustion is started to an appropriate temperature, so that it is possible to suppress the generation of HC.

Furthermore it would also be acceptable for there to be further included: a fuel injection valve which injects fuel directly into a combustion chamber of the internal combustion engine; a fuel pre-injection means which, at a time point before the cool-start means starts the internal combustion engine, controls the fuel injection valve so as to inject fuel in advance into the cylinder for which both an intake valve and an exhaust valve are in the closed state; and an ignition prevention means which prevents ignition in the cylinder for which both an intake valve and an exhaust valve are in the closed state, until the cool-start means starts the internal combustion engine.

According to this specialization, it is possible to start the combustion after having sufficiently mixed in advance the fuel and the air in a cylinder of which both the intake valve and the exhaust valve are in the closed state, so that it is possible to start the combustion in a more satisfactory manner.

A second aspect of the present invention relates to a control device for an internal combustion engine including a variable intake valve operation device which can stop the opening operation of an intake valve and a variable exhaust valve operation device which can stop the opening operation of an exhaust valve, and which, when a fuel cut-off execution condition has come into effect, performs fuel cut-off for a plurality of cylinders. The control device includes: an intake valve control means which, when the fuel cut-off execution condition has come into effect, controls the variable intake valve operation device, so as to keep in a closed state an intake valve of a cylinder, for which an exhaust valve is not kept in a closed state; and an exhaust valve control means which, when the fuel cut-off execution condition has come into effect, controls the variable exhaust valve operation device so as to keep in a closed state an exhaust valve of at least a pair of cylinders which were not in their intake stroke or compression stroke when the fuel cut-off execution condition came into effect, after an initial valve opening interval for the exhaust valve.

Furthermore it would also be acceptable, after a predetermined time period has elapsed from when the fuel cut-off execution condition has come into effect, for the exhaust valve control means to control the variable exhaust valve operation device, so as to keep the exhaust valves of all of the cylinders in a closed state.

According to this specialization, while fuel cut-off is being performed, and while effectively suppressing the flow-through of air to the catalyst while still ensuring good engine braking, it is possible to avoid the amount of flow-through of air to the catalyst undesirably exceeding a certain value.

A third aspect of the present invention relates to a method for controlling an internal combustion engine which performs fuel cut-off for a plurality of cylinders when a fuel cut-off execution condition has come into effect. The method includes the steps of: controlling, when the fuel cut-off execution condition has come into effect, an intake valve so as to keep in a closed state the intake valve of a cylinder, for which an exhaust valve is not kept in a closed state; and controlling, when the fuel cut-off execution condition has come into effect, an exhaust valve operation device, so as to keep in an open state the exhaust valve of at least a pair of cylinders, between which gases in pistons in the pair of cylinders come and go via an exhaust passage as the pistons operate.

A fourth aspect of the present invention relates to a method for controlling an internal combustion engine which performs fuel cut-off for a plurality of cylinders when a fuel cut-off execution condition has come into effect. The method includes the steps of: controlling, when the fuel cut-off execution condition has come into effect, an intake valve so as to keep in a closed state the intake valve of a cylinder, for which an exhaust valve is not kept in a closed state; and controlling, when the fuel cut-off execution condition has come into effect, an exhaust valve so as to keep in a closed state the exhaust valve of at least a pair of cylinders which were not in their intake stroke or compression stroke when the fuel cut-off execution condition came into effect, after an initial valve opening interval for the exhaust valve.

A fifth aspect of the present invention relates to a control device for an internal combustion engine. The control device includes: a variable intake valve operation device which can stop the opening operation of an intake valve; a variable exhaust valve operation device which can stop the opening operation of an exhaust valve; an intake valve control means which, when the fuel cut-off execution condition has come into effect, controls the variable intake valve operation device, so as to keep in a closed state at least the intake valve of a cylinder, for which an exhaust valve is not kept in a closed state; and an exhaust valve control means which, when the fuel cut-off execution condition has come into effect, controls the variable exhaust valve operation device so as to keep in an open state an exhaust valve of at least a pair of cylinders, between which gases in pistons in the pair of cylinders come and go via an exhaust passage as the pistons operate.

A sixth aspect of the present invention relates to a control device for an internal combustion engine. The control device includes: a variable intake valve operation device which can stop the opening operation of an intake valve; a variable exhaust valve operation device which can stop the opening operation of an exhaust valve; an intake valve control device which, when the fuel cut-off execution condition has come into effect, controls the variable intake valve operation device, so as to keep in a closed state at least the intake valve of a cylinder, for which an exhaust valve is not kept in a closed state; and an exhaust valve control device which, when the fuel cut-off execution condition has come into effect, controls the variable exhaust valve operation device so as to keep in a closed state an exhaust valve of at least a pair of cylinders which were not in their intake stroke or compression stroke when the fuel cut-off execution condition came into effect, after an initial valve opening interval for the exhaust valve.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIGS. 8A and 8B show a vertical sectional view schematically showing a situation, similarly based on the settings shown in FIG. 6, in which the exhaust valves of the #1 cylinder and the #2 cylinder are kept in a closed state, while the exhaust valves of the #3 cylinder and the #4 cylinder are kept in a stationary state at predetermined equal lift amounts;

FIG. 10 is a figure for explanation of intake and exhaust valve opening and closing timing settings used in the second embodiment of the present invention;

FIG. 12 is a figure for explanation of intake and exhaust valve opening and closing timing settings in a third embodiment of the present invention;

DETAILED DESCRIPTION OF THE PREFERRED EMBODIMENTS

Figure 1:
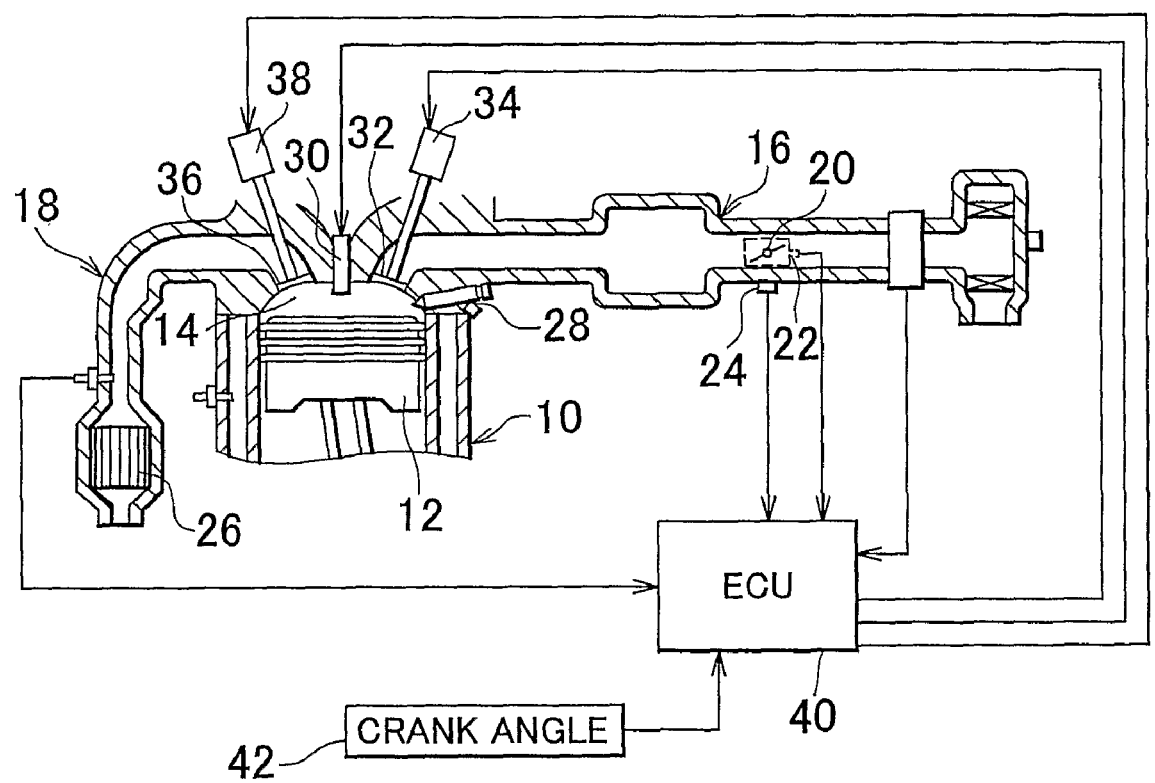
FIG. 1 is an explanatory structural view showing an internal combustion engine system according to a first embodiment of the present invention.

FIG. 1 is an explanatory structural view showing an internal combustion engine system according to a first embodiment of the present invention. In FIG. 1, an internal combustion engine 10 is a four cylinder in-line engine. A piston 12 is provided within a cylinder of this internal combustion engine 10 and the piston 12 is reciprocated in the cylinder. And a combustion chamber 14 is defined over the crown portion of the piston 12, within the cylinder of the internal combustion engine 10. Moreover, an intake passage 16 and an exhaust passage 18 communicate with this combustion chamber 14.

A throttle valve 20 is provided within the intake passage 16. And, in the neighborhood of this throttle valve 20, there are provided a throttle position sensor 22 which detects a throttle opening amount TA, and an idle switch 24 which is turned ON by the throttle valve 20 going to the fully closed state. Furthermore, a catalyst 26 for purifying the exhaust gases is provided within the exhaust passage 18.

A fuel injection valve 28 which injects fuel directly into the combustion chamber 14 (i.e. into the engine cylinder) is provided to the internal combustion engine 10. It should be understood that this fuel injection valve 28 might alternatively be one which injects fuel towards the intake passage 16. Furthermore, a spark plug 30 is fitted to the internal combustion engine 10. Moreover, the internal combustion engine 10 is also equipped with an intake valve operation device 34 which drives an intake valve 32, and a exhaust valve operation device 38 which drives an exhaust valve 36.

The system shown in FIG. 1 incorporates an ECU (Electronic Control Unit) 40. To this ECU 40, in addition to the above described throttle position sensor 22 and so on, there are also connected various sensors such as a crank angle sensor 42 which detects engine rotational speed and a cam angle sensor (not shown in the figures). Furthermore, the above described fuel injection valve 28, spark plug 30, intake valve operation device 34, and exhaust valve operation device 38 are also connected to this ECU 40.

Figure 2:
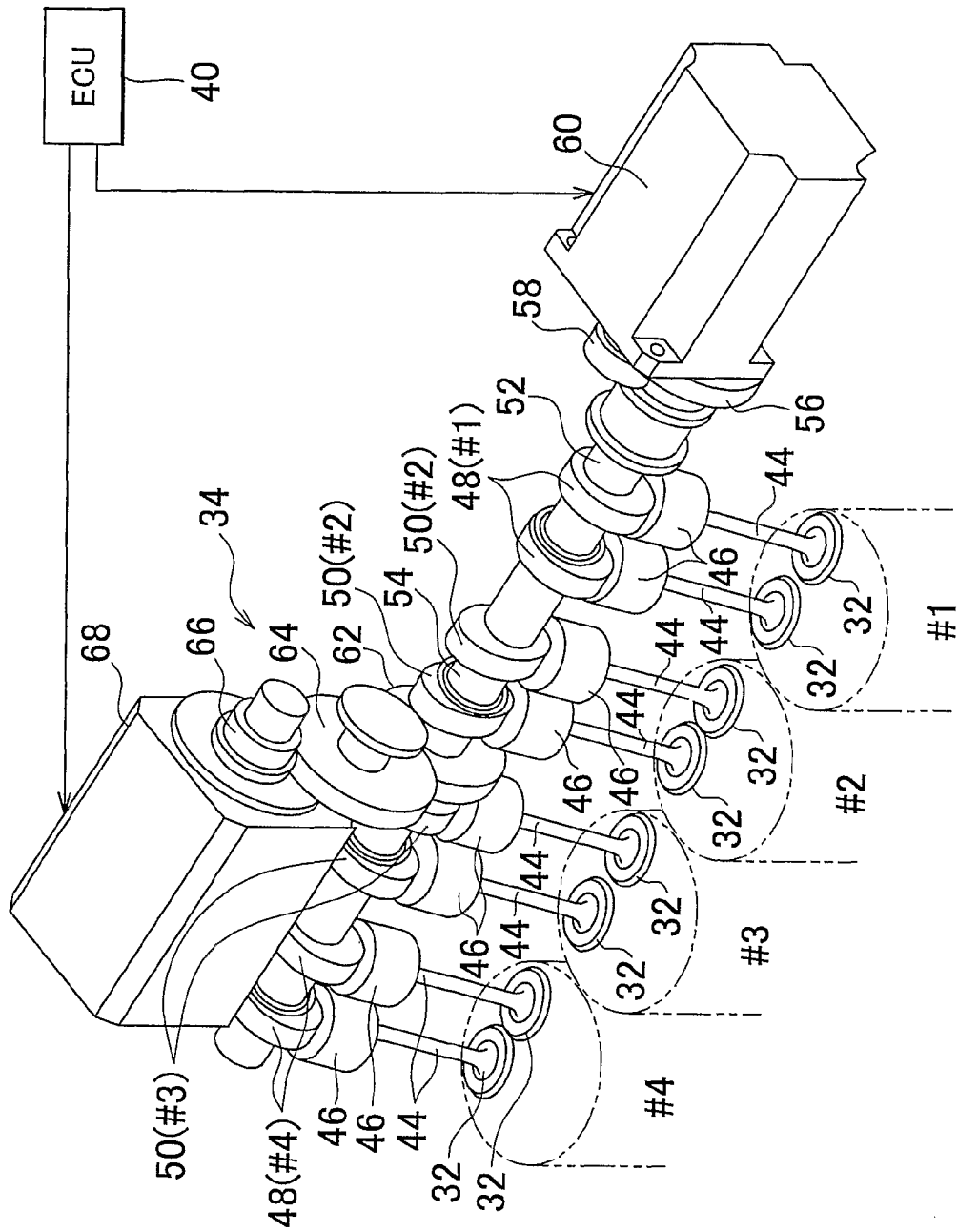
FIG. 2 is an external perspective view showing the structure of a variable operation device for intake valves one of which is shown in FIG. 1.

In the following, the structures of the intake valve operation device 34 and the exhaust valve operation device 38 according to the first embodiment of the present invention will be explained with reference to FIGS. 2 through 5. First, FIG. 2 is a perspective view showing the structure of the intake valve operation device 34 which is shown as a block in FIG. 1. This intake valve operation device 34 shown in FIG. 2 is, as described above, a device for driving the intake valves 32 of the internal combustion engine 10. In FIG. 2, the reference symbols #1 through #4 are the numbers of the cylinders of the internal combustion engine 10, which denote the first through the fourth cylinder. It should be understood that sometimes, in the following description, the first cylinder through the fourth cylinder are simply referred to using the symbols #1 through #4. It is presumed that the firing order for this internal combustion engine 10 is #1-#3-#4-#2, as is conventionally the case for an internal combustion engine.

As shown in FIG. 2, two intake valves 32 are provided to each of the cylinders of the internal combustion engine 10. A valve shaft 44 is fixed to each of these intake valves 32. And valve lifters 46 are fitted to the upper end portions of these valve shafts 44. The urging force of a valve spring not shown in the figures acts on each valve shaft 44, and its intake valve 32 is urged in the valve closing direction by this urging force.

At the upper portion of each of the valve lifters 46 there is disposed a corresponding intake cam 48 or 50. As shown in FIG. 2, here, the intake cams which correspond to the valve lifters 46 provided for the #1 and #4 cylinders are designated as intake cams 48, while the intake cams which correspond to the valve lifters 46 provided for the #2 and #3 cylinders are distinguished therefrom by being designated as intake cams 50. The intake cams 48 which correspond to the #1 cylinder and to the #4 cylinder are fixed on an intake camshaft 52. On the other hand, the intake cams 50 which correspond to the #2 cylinder and to the #3 cylinder are fixed on an intake camshaft 54 which is rotatable with respect to and coaxial with the intake camshaft 52.

In other words, in the structure shown in FIG. 2, the same intake camshaft is used for both of the cylinders (#1 and #4, #2 and #3) in each pair whose firing timings are different by just 360° CA (Crank Angle). According to this type of structure, independent rotational or to-and-fro action becomes possible for each of these two intake camshafts, in other words for the intake camshaft 52 which corresponds to the #1 cylinder and the #4 cylinder, and for the intake camshaft 54 which corresponds to the #2 cylinder and the #3 cylinder. It should be understood that each of the intake camshaft 52 and the intake camshaft 54 is rotatably supported by a support member such as a cylinder head or the like, not shown in the figures.

A first driven gear 56 is coaxially fixed to the intake camshaft 52. A first output gear 58 is meshed with this first driven gear 56. This first output gear 58 is coaxially fixed on the output shaft of a first motor 60. According to this structure, based on a command from the ECU 40, the torque of the first motor 60 can be transmitted via these gears 58 and 56 to the intake camshaft 52.

Similarly, a second driven gear 62 is coaxially fixed to the intake camshaft 54. A second output gear 66 is meshed with this second driven gear 62 via an intermediate gear 64. This second output gear 66 is coaxially fixed on the output shaft of a second motor 68. According to this structure, based on a command from the ECU 40, the torque of the second motor 68 can be transmitted via these gears 66, 64, and 62 to the intake camshaft 54.

Figure 3:
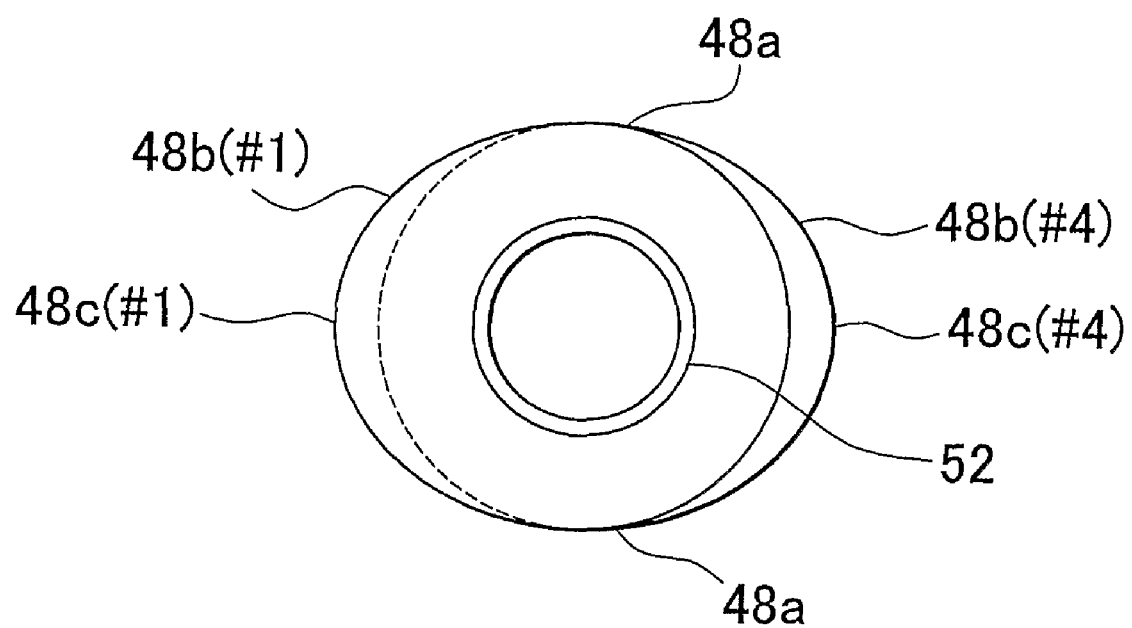
FIG. 3 is a side view showing an intake camshaft as seen along its axial direction, for explanation of the mutual positional relationship of intake cams shown in FIG. 2.

FIG. 3 is a side view showing the intake camshaft 52 as seen along its axial direction, for explanation of the detailed structure of the intake cams 48 shown in FIG. 2. As described above, the intake cams 48 for the #1 cylinder and the intake cams 48 for the #4 cylinder are fixed on this intake camshaft 52. As shown in FIG. 3, each of the intake cams 48 (#1) for the #1 cylinder has two intake cam surfaces 48a and 48b which have different profiles. One of these intake cam surfaces 48a is formed as a cylindrical base portion which functions as a non-operating surface, with the distance from the center of the intake camshaft 52 being constant. And the other intake cam surface 48b is formed as a cam nose which functions as an operating surface 48, with the distance from the center of the intake camshaft 52 steadily increasing up to its summit portion 48c, and thereafter steadily decreasing.

Furthermore, just like the intake cams 48 for the #1 cylinder, each of the intake cams 48 for the #4 cylinder also has a non-operating surface 48a and an operating surface 48b. And the summit portions 48c of the intake cams 48 (#1) and the summit portions 48c of the intake cams 48 (#4) are arranged so as to be mutually spaced apart by 180° in the rotational direction around the intake camshaft 52. Moreover, although the detailed explanation thereof will herein be omitted, the structure of the intake camshaft 54 which corresponds to the #2 cylinder and the #3 cylinder is the same as that of the intake camshaft 52, described above.

According to the structure of the intake valve operation device 34 as described above, the intake camshafts 52 and 54 can be rotationally operated by the ECU 40 providing drive commands to the first and second motors 60 and 68 so that each of the intake camshafts 52 and 54 is continuously rotationally driven in one direction. Furthermore, the ECU 40 may change the drive command which it supplies to the first motor 60 etc., so that the direction of rotation of the first motor 60 etc. reverses during the valve opening operation of the intake valves 32. By doing this, it is possible for the intake camshaft 52 etc. to perform to-and-fro operation. As a result, it is possible for this intake valve operation device 34 to control the opening characteristics of the intake valves 32 (the lift amounts, the operating angles, the valve opened intervals, and so on) to any desired values, and moreover it is possible for the intake valve operation device 34 to stop the valve opening operation of the intake valves 32 and hold them at a position corresponding to a desired lift amount (including zero lift amount established when the piston is at an approximately intermediate position between the top and bottom dead centers).

Figure 4:
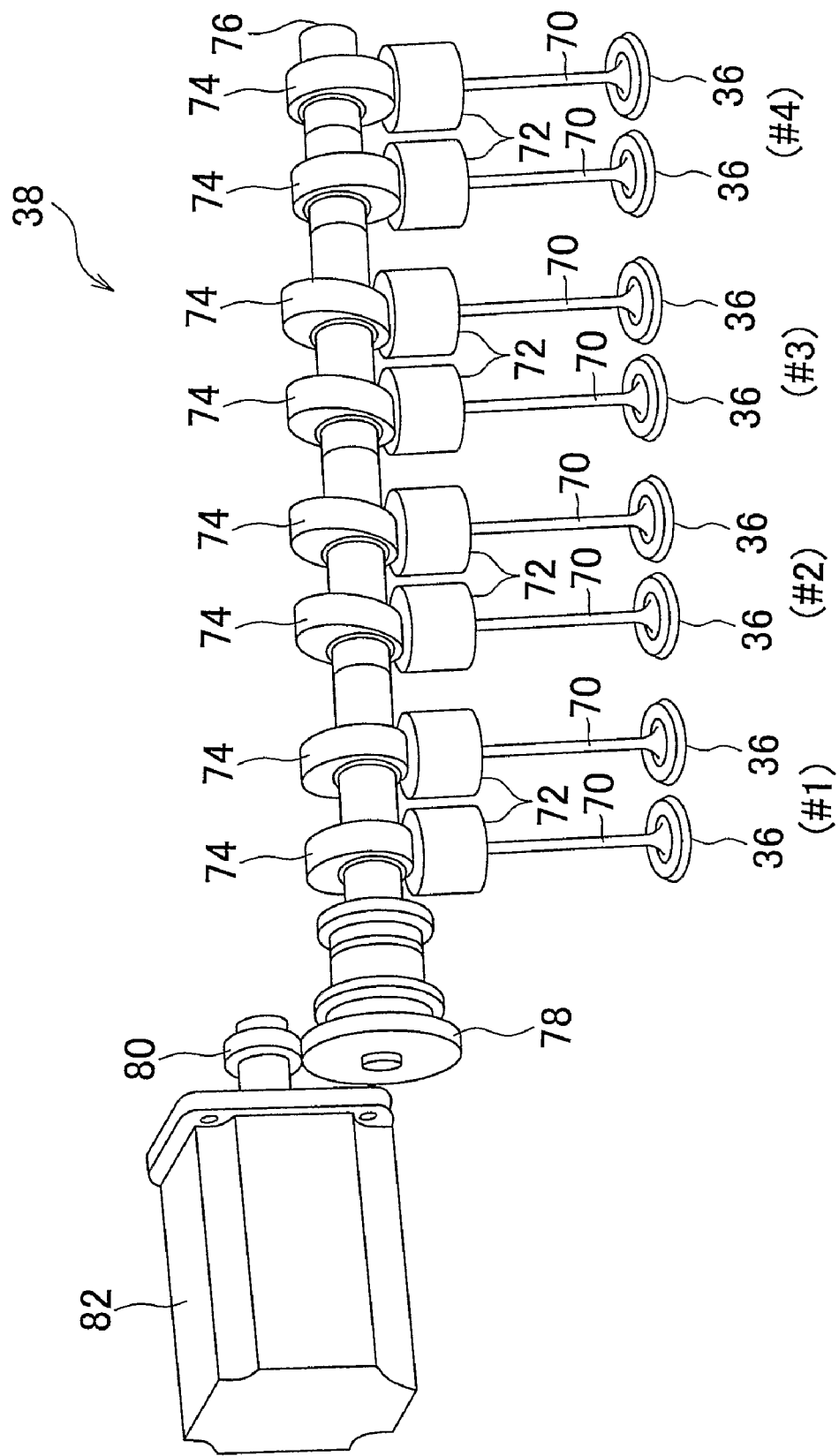
FIG. 4 is an external perspective view showing the structure of a variable operation device for exhaust valves one of which is shown in FIG. 1.

Next, FIG. 4 is a perspective view showing the structure of the exhaust valve operation device 38 which is shown in FIG. 1. This exhaust valve operation device 38 is a device for driving the exhaust valves 36 of the above described internal combustion engine 10. As shown in FIG. 4, two exhaust valves 36 are provided to each of the cylinders of the internal combustion engine 10. A valve shaft 70 is fixed to each of these exhaust valves 36. And valve lifters 72 are fitted to the upper end portions of these valve shafts 70. The urging force of a valve spring not shown in the figures acts on each valve shaft 70, and its exhaust valve 36 is continually urged in the valve closing direction by this urging force.

At the upper portion of each of the valve lifters 72 there is disposed an exhaust cam 74. As shown in FIG. 4, on the exhaust side, all of the exhaust cams 74 for all of the engine cylinders are fixed to a single exhaust camshaft 76 at predetermined fixing angles different for each cylinder. A driven gear 78 is coaxially fixed to one end of this exhaust camshaft 76. And an output gear 80 is meshed with this driven gear 78. This output gear 80 is coaxially fixed on an output shaft of a motor 82. According to this structure, based on a command from the ECU 40, the torque of the motor 82 can be transmitted via these gears 80 and 78 to the exhaust camshaft 76.

Figure 5:
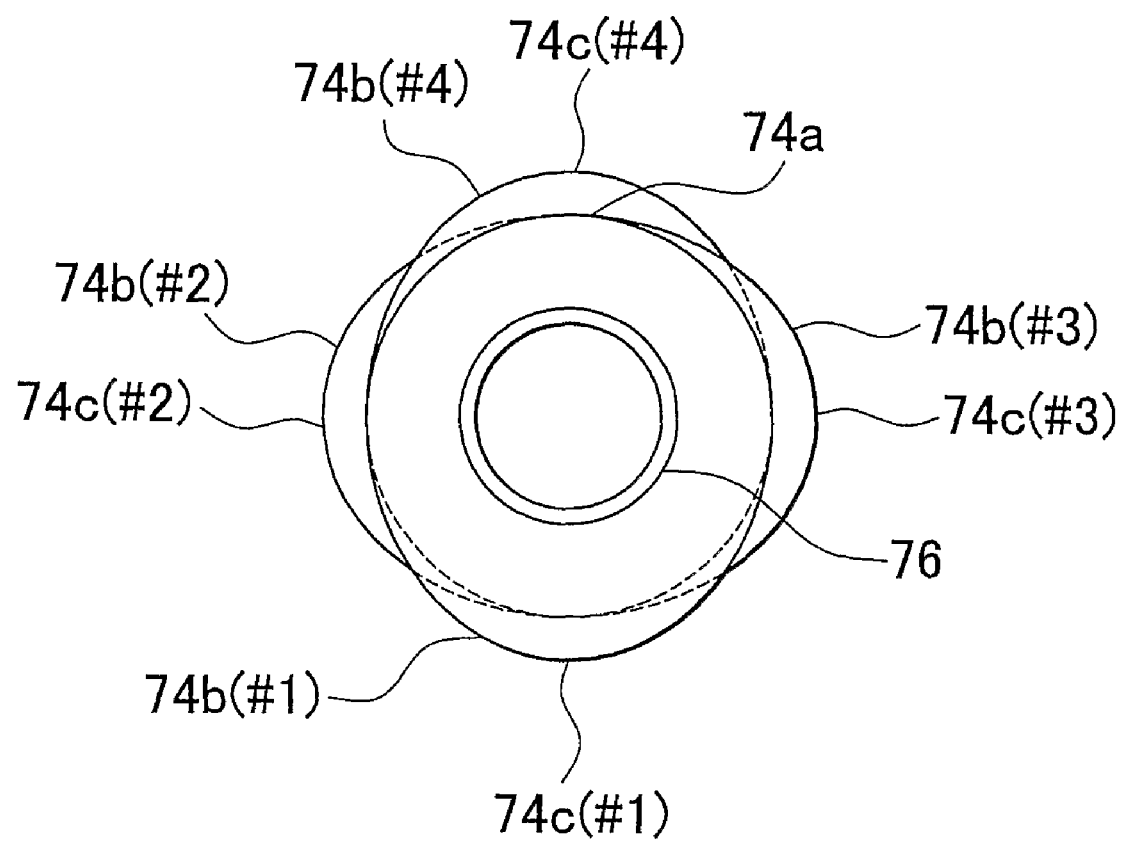
FIG. 5 is a side view showing an exhaust camshaft as seen along its axial direction, for explanation of the mutual positional relationship of exhaust cams shown in FIG. 4.

FIG. 5 is a figure showing the exhaust camshaft 76 of FIG. 4 as seen along its axial direction. As described above, the exhaust cams 74 for each of the cylinders #1 through #4 are fixed on this exhaust camshaft 76. Each of these exhaust cams 74, just like the intake cams 48, has a non operating surface 74a (a cylindrical base portion) and an operating surface 74b. And, with these exhaust cams 74, the summit portions 74c of the respective cylinders are arranged in accordance with the firing order of the internal combustion engine 10, in other words in the order #1-#3-#4 #2, by being spaced apart at intervals of 90° from each other along the rotational direction of the exhaust camshaft 76.

According to the above described structure of the exhaust valve operation device 38, the exhaust camshaft 76 can be rotationally operated by the ECU 40 providing a drive command to the motor 82 so that the exhaust camshaft 76 is continuously rotationally driven in one direction. As a result, it is possible to operate the exhaust valves 36 so that they open and close, and moreover it is possible to change the valve opening phase of the exhaust valves 36, by changing the timing of the rotation of the exhaust camshaft 76 with respect to the rotation of the crankshaft. Yet further, it is also possible to stop the valve opening operation of the exhaust valves 36 and hold them at a position corresponding to a desired lift amount including the zero lift amount.

With an internal combustion engine, if a predetermined operational condition is in effect during deceleration or the like, processing is performed for stopping the injection of fuel; in other words, fuel cut-off (hereinafter termed "F/C") is performed. When F/C is being performed, air flows into the exhaust passage 18 and to the catalyst 26. When lean gas at a high temperature thus flows to the catalyst 26, the catalyst 26 deteriorates, which is undesirable. Furthermore, during deceleration, the generation of engine braking is required, in order to obtain a feeling of deceleration. Thus, in the system of this embodiment, during F/C, the valve opening operation of the intake and exhaust valves 32 and 36 is controlled with the technique shown in FIG. 6, in order effectively to suppress deterioration of the catalyst 26 while still ensuring engine braking as desired, as will be described below.

Figure 6:
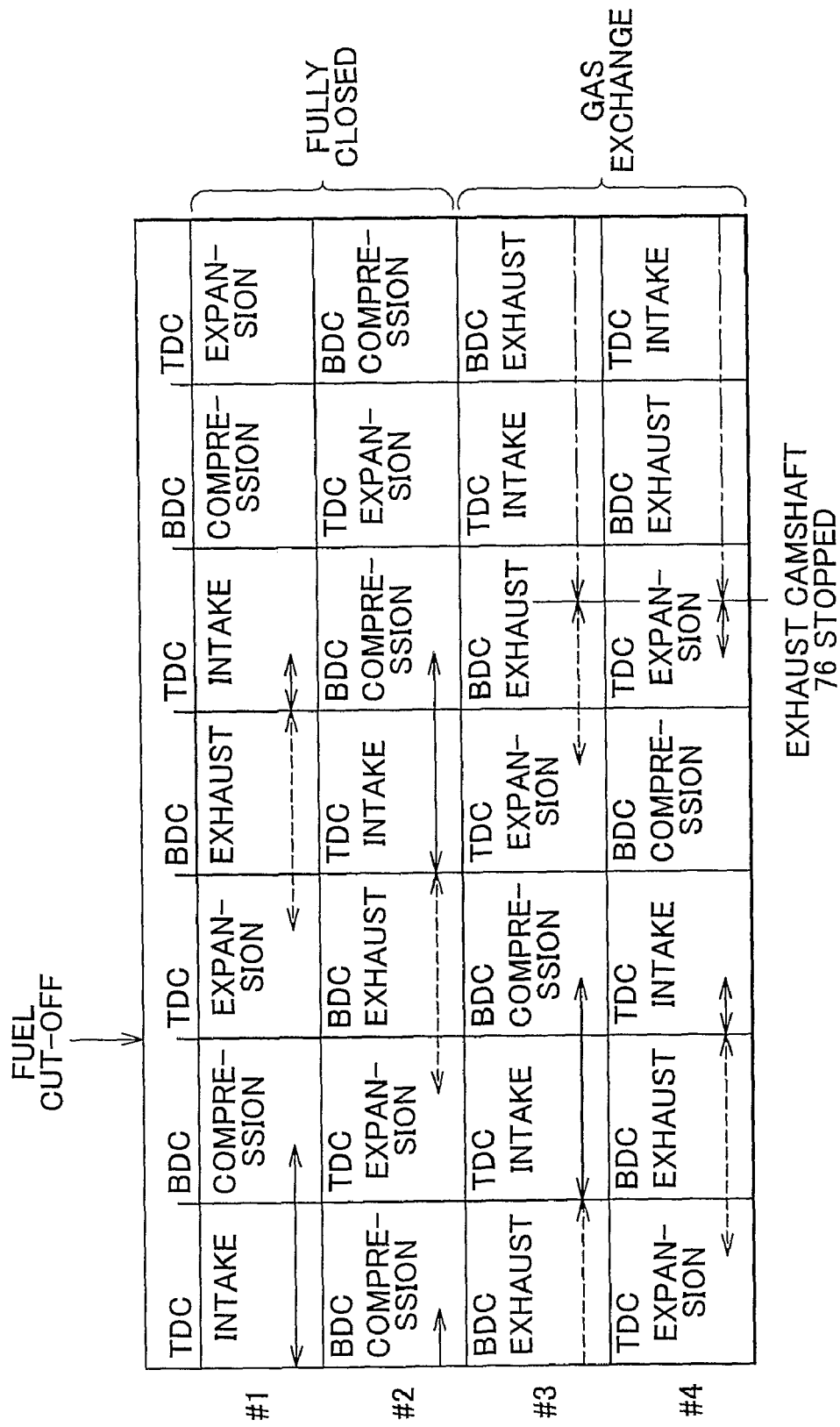
FIG. 6 is a figure for explanation of intake and exhaust valve opening and closing timing settings employed in this first embodiment of the present invention.

FIG. 6 is a figure for explanation of the opening and closing timing settings used for the intake and exhaust valves 32 and 36 in this first embodiment of the present invention. In the example of FIG. 6 it is shown by way of example that the condition for performing F/C comes into effect when the piston 12 of the #1 cylinder is close to its top dead center (so called "compression TDC") after it has completed its compression stroke, and the explanation will be given using this example. It should be understood that, in FIG. 6, the periods indicated by the solid lines with arrow signs denote the valve opening intervals of the intake valves 32, whereas the periods indicated by the broken lines with arrow signs denote the valve opening intervals of the exhaust valves 36. Furthermore, the periods indicated by the single dotted broken lines with arrow signs denote periods in which the system is in a state with the exhaust valves 36 being stopped in their partway valve opened positions, in order to perform gas exchange of the exhaust gases via the exhaust manifold between the #3 cylinder and the #4 cylinder.

According to the settings shown in FIG. 6, for the #1 cylinder, during the initial expansion stroke after the condition for performing F/C comes into effect, the exhaust valves 36 are opened in the same manner as during normal operation, and the exhaust gases after combustion are vented into the exhaust passage 18. Next, after the intake valves 32 have opened in the neighborhood of exhaust TDC, during the following intake stroke, they are closed when the piston 12 is positioned at a location which is intermediate between top dead center and bottom dead center. And, subsequently, the intake valves 32 and the exhaust valves 36 are kept in their closed states until the condition for performing F/C is cancelled. It should be understood that, subsequently in this specification, when a piston 12 is at a position intermediate between its top dead center and its bottom dead center, sometimes this will simply be expressed as "the piston 12 is at an intermediate point".

When the condition for performing F/C comes into effect, the exhaust valves 36 of the #2 cylinder are partway through their valve opening interval, and this valve opening interval proceeds as normal. Next, after the intake valves 32 have opened as normal, they are closed when the piston 12 comes to be positioned at an intermediate point of its compression stroke. And, subsequently, the intake valves 32 and the exhaust valves 36 are kept in their closed states until the condition for performing F/C is cancelled.

When the condition for performing F/C comes into effect, the intake valves 32 of the #3 cylinder are partway through their valve opening interval. These intake valves 32 are closed when the piston 12 comes to be positioned at an intermediate point in its compression stroke which is arrived at partway through this valve opening interval, and thereafter they are kept in a closed state until the condition for performing F/C ceases to hold. And, after the exhaust valves 36 have been opened partway through the initial expansion stroke after the condition for performing F/C has come into effect, at the time point partway through the exhaust stroke that a lift amount which is equal to the lift amounts of the exhaust valves 36 of the #4 cylinder has been ensured, their valve opening operation is stopped, until subsequently the condition for performing F/C is cancelled.

In the case of the #4 cylinder, when the condition for performing F/C comes into effect, the timing of the valve opening operation of the intake valves 32 is that, after the intake valves 32 have been opened at their normal timing, they are closed when the piston 12 comes to be positioned near an intermediate point, and thereafter they are kept in a closed state until the condition for performing F/C is cancelled. And, directly after the exhaust valves 36 have been opened partway through the initial expansion stroke after the condition for performing F/C has come into effect, at the time point partway through the exhaust stroke that a lift amount which is equal to the lift amounts of the exhaust valves 36 of the #3 cylinder has been ensured, their valve opening operation is stopped, until subsequently the condition for performing F/C is cancelled.

Figure 7:
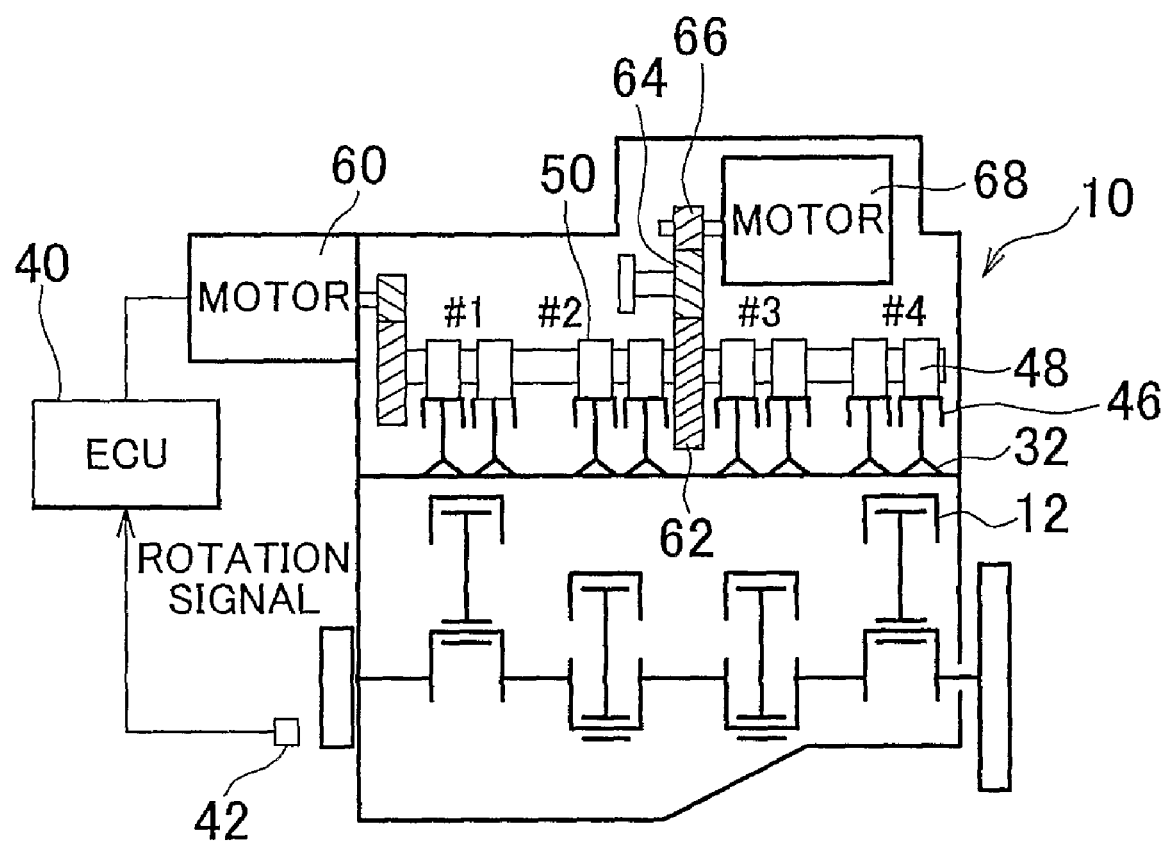
FIG. 7 is a vertical sectional view schematically showing a situation, based on the settings shown in FIG. 6, in which the intake valves of all the engine cylinders are kept in a closed state.

FIG. 7 shows a situation in which, based on the settings shown in FIG. 6, the intake valves 32 of all of the cylinders are kept in a closed state. According to the intake valve operation device 34 of this embodiment, it is possible to keep the intake valves 32 of all of the cylinders in a closed state by the driving of the motors 60 and 68 by the ECU 40 being stopped in the state in which the cylindrical base portions (48a) of the intake cams 48 and 50 are in contact with the valve lifters 46. Due to this, according to the settings shown in FIG. 6 and described above, when the condition for performing F/C is in effect, it is possible to ensure that no air is inhaled into the combustion chambers 14.

FIGS. 8A and 8B show a situation in which, based on the settings shown in FIG. 6, the exhaust valves 36 for the #1 cylinder and the #2 cylinder are kept in a closed state, while the exhaust valves 36 for the #3 cylinder and the #4 cylinder are kept in a stationary state at predetermined equal lift amounts. In more concrete terms, FIG. 8A shows the internal combustion engine 10 in this state, while FIG. 8B is a figure showing the exhaust camshaft 76, in this state, as seen along its axial direction.

With the structure of this embodiment, the cam profiles of the exhaust cams 74 are set so that it is the case that the lift amounts of the exhaust valves of the #3 cylinder and the #4 cylinder are the same, when the driving of the motor 82 by the ECU 40 has been stopped in a state in which, as shown in FIG. 8B, the exhaust valves 36 of the #3 cylinder and the #4 cylinder are both opened simultaneously.

Since with this internal combustion engine 10, as described above, the firing order is #1→#3→#4→#2, accordingly, as shown in FIG. 8A, the pistons 12 of the #1 cylinder and the #4 cylinder perform their upwards and downwards motions at a phase difference of 180° CA, as do the pistons 12 of the #2 cylinder and the #3 cylinder. Thus, as described above, in the state in which the exhaust valves 36 of the #3 cylinder and the #4 cylinder are opened by the same lift amount, when the piston 12 of the #3 cylinder and the piston 12 of the #4 cylinder move upwards and downwards, the exhaust gases come and go between the #3 cylinder and the #4 cylinder. That is, the exhaust gases come and go alternatingly between the #3 cylinder and the #4 cylinder via the exhaust manifold; in other words, gas exchange of the exhaust gases is performed.

On the other hand, according to the settings described above and shown in FIG. 6, the intake and exhaust valves 32 and 36 of the #1 cylinder and the #2 cylinder are all kept in the fully closed state. Due to this, during this period in which these valves are kept fully closed in this manner, the gases within the combustion chambers 14 of this #1 cylinder and #2 cylinder are repeatedly and alternatingly compressed and expanded by the compression and expansion strokes which are performed. Furthermore, as described above, according to the settings described above and shown in FIG. 6, it is arranged to close the intake valves 32 when the exhaust valves 36 are in a closed state and moreover the piston 12 is near an intermediate position between the top dead center and the bottom dead center. Due to this, when the gases within the combustion chambers 14 are repeatedly and alternatingly compressed and expanded by the compression and expansion strokes, it is possible to ensure that the gas pressure (the amount of contained gas) within the combustion chambers 14 when the intake and exhaust valves 32 and 36 are closed is appropriate, and it becomes possible to suppress the peak values of load amount on the crankshaft to the minimum limit.

According to the settings described above and shown in FIG. 6, it is possible reliably to prevent air from flowing to the catalyst 26 by, for the #1 cylinder and the #2 cylinder, keeping the intake and exhaust valves 32 and 36 in the fully closed state. Furthermore, for the #3 cylinder and the #4 cylinder, by the exhaust valves 36 for these two cylinders whose pistons 12 perform upwards and downwards motion in opposite senses being kept in an open state at the same lift amount, it is possible to perform gas exchange between these cylinders, with the gas amounts sucked in thereto and exhausted therefrom being in good mutual balance. Due to this it is possible, while ensuring good engine braking by pumping action, also effectively to suppress the flow-through of air to the catalyst 26.

Figure 9A:
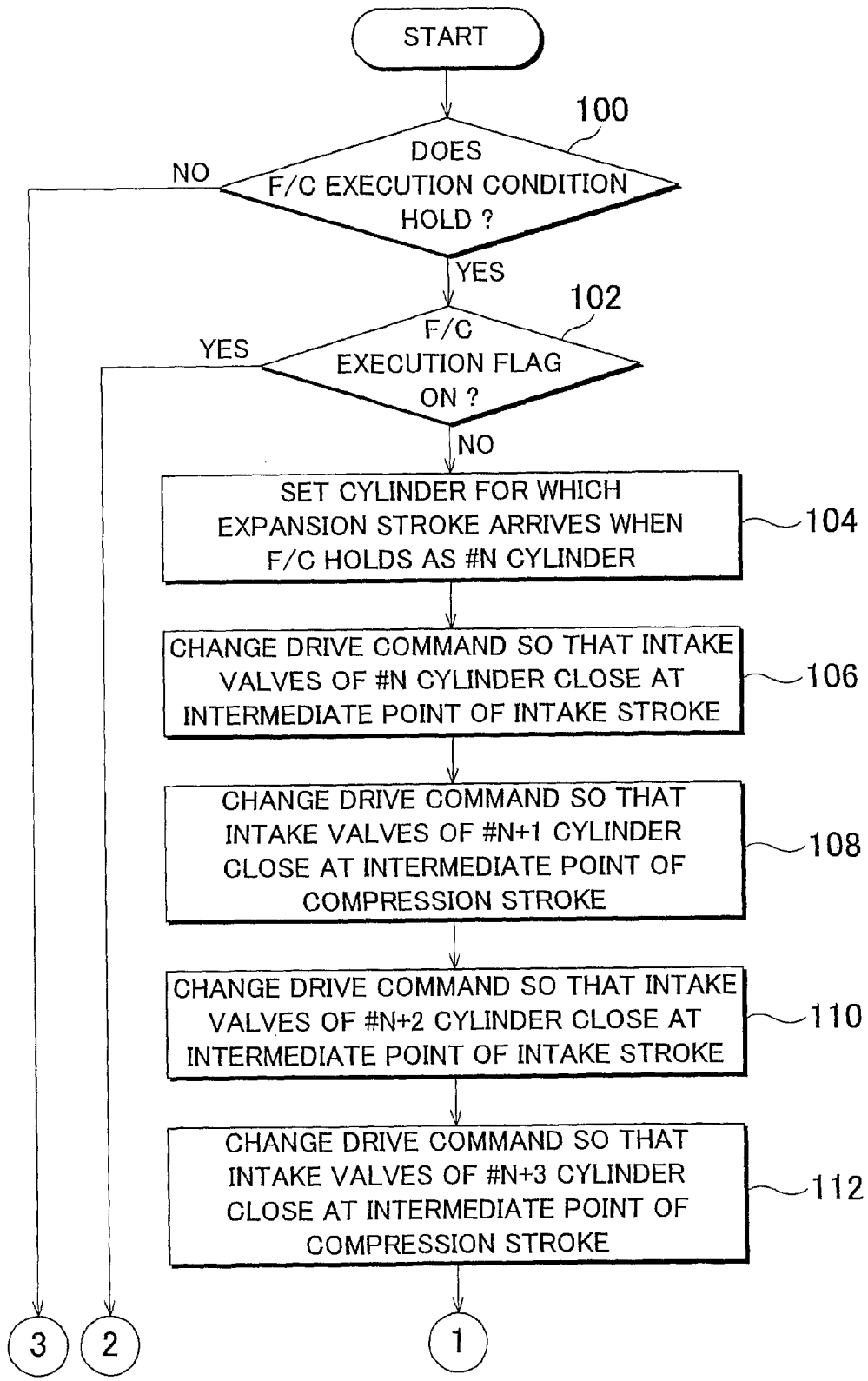
FIGS. 9A and 9B show a flow chart of a routine which is executed in the first embodiment of the present invention.
Figure 9B:
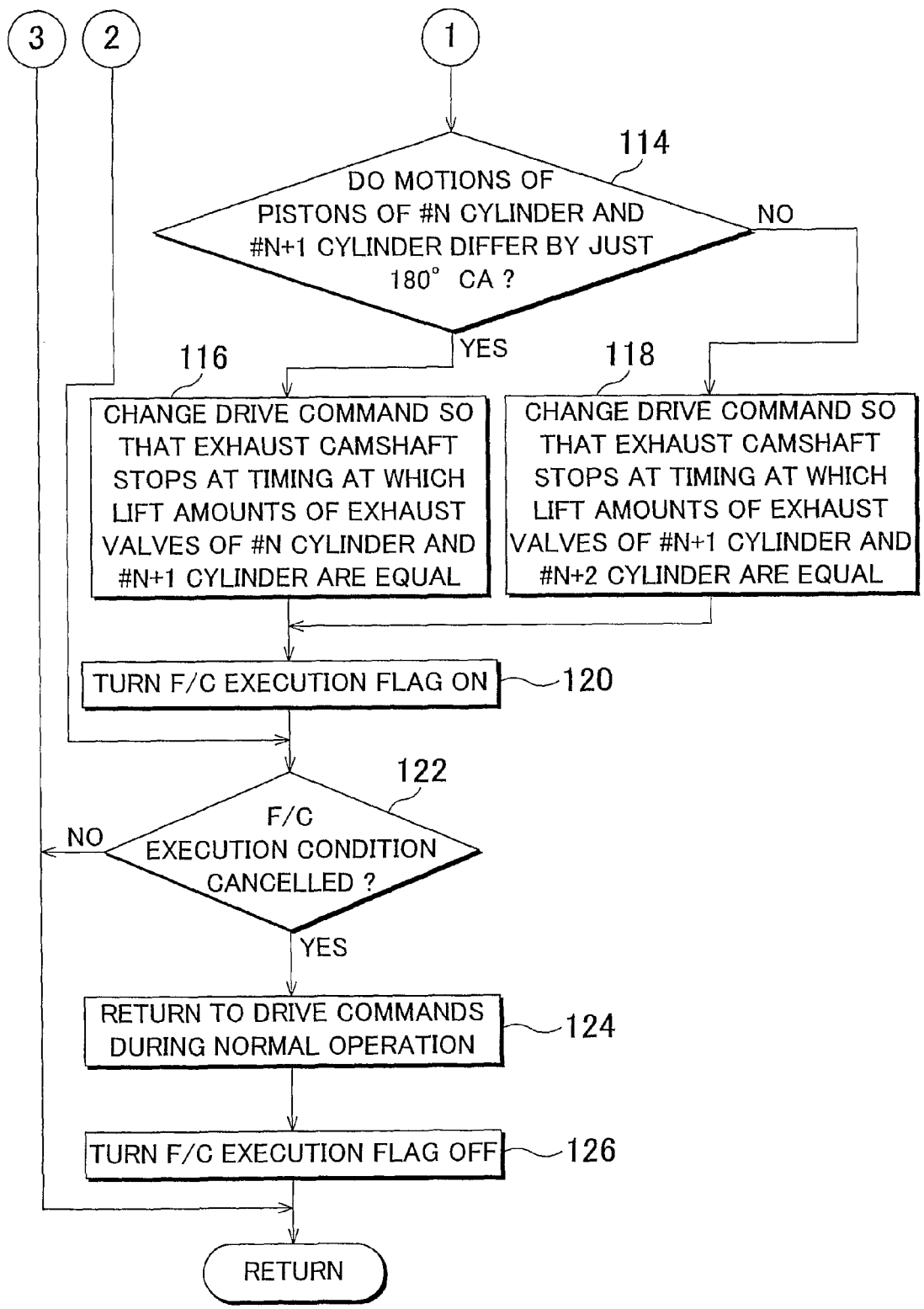

FIGS. 9A and 9B show a flow chart of a routine which is executed by the ECU 40 in this first embodiment, in order to implement the functions described above. In this routine shown in FIGS. 9A and 9B, first, a decision is made (in a step 100) as to whether or not a predetermined condition for performing F/C holds. If the result is that the F/C execution condition holds, then a decision is made (in a step 102) as to whether or not a F/C execution flag is ON. If it has been decided that the F/C execution flag is ON, then the processing of the following steps 104 through 120 is skipped, and the processing of the step 122 is performed.

On the other hand, if in the above described step 102 it has been decided that the F/C execution flag is not ON, in other words if it has been decided that this processing cycle is the first one to be started after the F/C execution condition has first come into effect, then, next, the cylinder which first arrives at its expansion stroke after the F/C execution condition has first come into effect, i.e., in more detail, the cylinder for which the predetermined timing of the initial start of its expansion stroke first arrives after the F/C execution condition has first come into effect, is set (in a step 104) as the #n cylinder. It should be understood that, here, the order of the cylinders #n, #n+1, etc. is supposed to correspond to the firing order #1→#3→#4→#2→#1 of the internal combustion engine 10.

Next, the drive command for the corresponding motor among the first motor 60 and the second motor 68 is changed (in a step 106) from the normal drive command, so that the intake valves 32 of the #n cylinder close at an intermediate point of the intake stroke which first arrives after the F/C execution condition has come into effect. In more concrete terms, during normal operation, based upon the operational state of the internal combustion engine 10, the ECU 40 issues drive commands to the motors 60, 68, and 82 so that the opening characteristics of the intake and exhaust valves 32 and 36 conform to the desired characteristics. In other words, in this step 106 (and the same holds also for the following steps 108 through 112, 116, and 118), the types of drive commands come to be changed from the ones during normal operation, based on a request when the F/C execution condition holds.

Next, the drive command for the corresponding motor is changed (in a step 108) so that the intake valves 32 of the #n+1 cylinder close at an intermediate point of the compression stroke which now arrives. Next, the drive command for the corresponding motor is changed (in a step 110) so that the intake valves 32 of the #n+2 cylinder close at an intermediate point of the intake stroke which now arrives. And, next, the drive command for the corresponding motor is changed (in a step 112) so that the intake valves 32 of the #n+3 cylinder close at an intermediate point of the compression stroke which first arrives after the F/C execution condition holds.

Next, a decision is made (in a step 114) as to whether or not the #n cylinder and the #n+1 cylinder which correspond to the settings in the above described step 104 are a pair of cylinders for which the operation of the pistons 12 is different by just 180° CA. If the result of this decision is that the #n cylinder and the #n+1 cylinder correspond to such a pair of cylinders (i.e., with the settings shown in FIG. 6 and described above, if the #n cylinder is the #3 cylinder or the #2 cylinder), then the drive command for the motor 82 is changed (in a step 116) so that the exhaust camshaft 76 is stopped at a timing at which the lift amounts of the exhaust valves 36 of the #n cylinder and the #n+1 cylinder are equal to one another.

On the other hand, if in the above described step 114 it has been decided that the #n cylinder and the #n+1 cylinder do not correspond to such a pair of cylinders (i.e, with the settings shown in FIG. 6 and described above, if the #n cylinder is the #4 cylinder or the #1 cylinder), then the drive command for the motor 82 is changed (in a step 118) so that the exhaust camshaft 76 is stopped at a timing at which the lift amounts of the exhaust valves 36 of the #n+1 cylinder and the #n+2 cylinder are equal to one another. And next (in a step 120) the F/C execution flag is turned ON.

Next, a decision is made (in a step 122) as to whether or not the F/C execution condition is cancelled. If the result of this decision is that the F/C execution condition is not cancelled, then this processing cycle is terminated immediately; while, on the other hand, if it has been decided that the F/C execution condition is cancelled, then (in a step S124) the drive command for the motor is returned to the drive command during normal operation, in other words to a drive command based upon the operating state of the internal combustion engine 10. And next the F/C execution flag is turned OFF (in a step 126).

According to the routine shown in FIGS. 9A and 9B and explained above, a pair of cylinders are selected for which the operation of the pistons 12 differs by just 180° CA, and, while the F/C execution condition holds, along with gas exchange being performed via the exhaust manifold for this pair of cylinders which have been selected, the intake and exhaust valves 32 and 36 for the other pair of cylinders are kept fully closed. Due to this it is possible, during F/C execution, effectively to suppress the flow-through of air to the catalyst 26, while still ensuring engine braking due to pumping action.

By the way, in the above described first embodiment, it is arranged to keep the intake valves 32 of all of the cylinders in a closed state during F/C execution. However, it would also be possible not necessarily to close the intake valves of all of the cylinders, while still suppressing the flow-through of air to the catalyst 26; for example, it would be sufficient to keep in a closed state, during F/C execution, at least the intake valves 32 of those of the cylinders whose exhaust valves 36 are not kept in a closed state.

Furthermore, in the above described first embodiment, during F/C execution, it was arranged to keep in a closed state the exhaust valves 36 of the cylinders other than a pair of cylinders for which the operation of the pistons was different by just 180° CA. However, in order to suppress the flow-through of air to the catalyst 26, it would also be acceptable to keep in a closed state only the intake valves 32, or only the exhaust valves 36, of those cylinders other than the above described pair of cylinders.

Furthermore although, in the above described first embodiment, during F/C execution, it was arranged to keep in an open state the exhaust valves 36 for a pair of cylinders for which the operation of the pistons was different by just 180° CA, it would also be acceptable, instead of this type of technique, to perform the control described below. In concrete terms, with a variable exhaust valve operation device as well being fitted, having made it possible, in the same manner as with the above described intake valve operation device 34, to drive the exhaust camshaft with two motors, it would also be acceptable to arrange to close the exhaust valves 36 for the above described pair of cylinders which are being kept in an open state after a predetermined time period has elapsed from when the F/C execution condition came into force. As in the above described first embodiment, while performing gas exchange by using the above described pair of cylinders as well; a certain flow of air to the catalyst 26 may occur, although this will be rather small. According to this type of technique, during F/C execution, the flow-through of air to the catalyst 26 is effectively suppressed while still ensuring good engine braking; in other words, it is possible to avoid the flow through amount of air to the catalyst 26 undesirably exceeding some certain fixed value.

It should be understood that, in the above described first embodiment, the "intake valve control means" is implemented by the ECU 40 performing the processing of the above described steps 100 through 112, and the "exhaust valve control means" is implemented by the ECU 40 performing the processing of the above described steps 100 through 104 and 114 through 118. Furthermore, the motor 82 corresponds to the "drive means".

Next, a second preferred embodiment of the present invention will be explained with reference to FIGS. 10 and 11. The system of this second embodiment may be implemented by using the hardware structure shown in FIGS. 1 through 5 above, while executing, in the ECU 40, the routine shown in FIGS. 11A and 11B and described below, instead of the routine shown in FIGS. 9A and 9B.

FIG. 10 is a figure for explanation of the opening and closing timing settings used for the intake and exhaust valves 32 and 36 in this second embodiment of the present invention. With the settings of the above described FIG. 6, when the condition for performing F/C comes into effect, or directly thereafter, for the two cylinders which are in their compression stroke and their intake stroke (in the example shown in FIG. 6, the #3 cylinder and the #4 cylinder), their intake valves 32 are kept in a closed state, so that they remain in a state in which air is charged into their combustion chambers 14. Due to this, when the exhaust valves 36 of this #3 cylinder and #4 cylinder are subsequently opened, it may happen that the air which has been charged into their combustion chambers 14 undesirably flows out to the catalyst 26.

Thus it is arranged for the settings shown in FIG. 10 to differ in the following aspects from those shown in FIG. 6 and described above. That is, for the #3 cylinder and the #4 cylinder whose compression stroke and intake stroke arrive when the condition for performing F/C comes into effect or directly thereafter, control is not performed to keep their exhaust valves 36 in the opened state for gas exchange, but instead it is arranged to keep their exhaust valves 36 in a closed state.

Furthermore, with regard to the intake valves 32 of the #1 cylinder and the #2 cylinder whose expansion stroke and exhaust stroke arrive when the condition for performing F/C comes into effect or directly thereafter, when stopping the intake and exhaust valves 32 and 36, in order to prevent the peak value of the working amount due to compression and expansion becoming high, valve closing control is not performed for the intake valves 32 in the neighborhood of an intermediate point of the piston 12, but rather it is arranged, after the condition for performing F/C comes into effect, directly to keep the intake valves 32 in a closed state. And moreover, with regard to the exhaust valves 36 of this #1 cylinder and #2 cylinder, due to gas exchange from partway through the expansion stroke and the exhaust stroke which arrive when the condition for performing F/C comes into effect or directly thereafter, it is arranged to perform control to keep these exhaust valves 36 in the opened state.

Figure 11A:
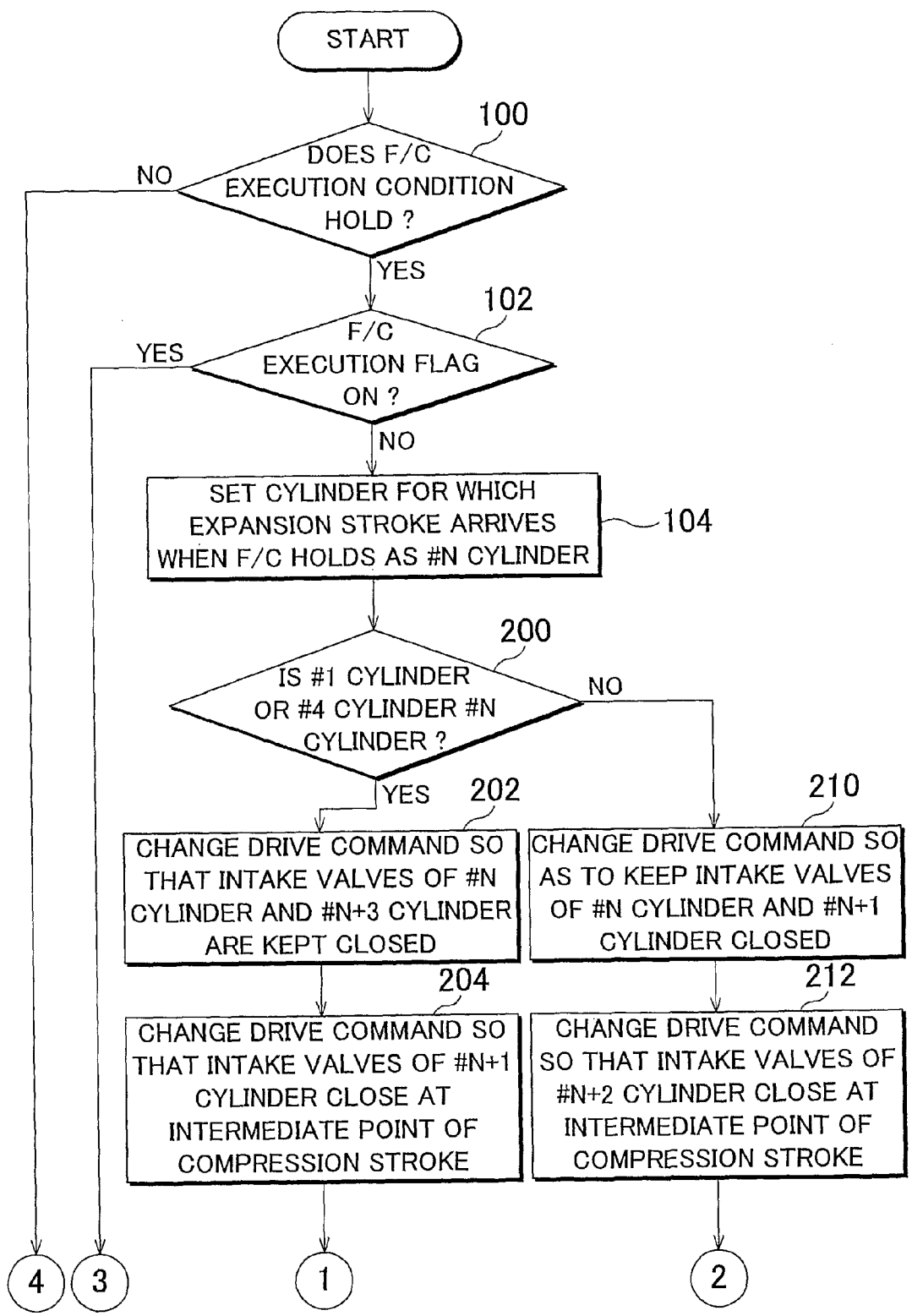
FIGS. 11A and 11B show a flow chart of a routine which is executed in the second embodiment of the present invention.
Figure 11B:
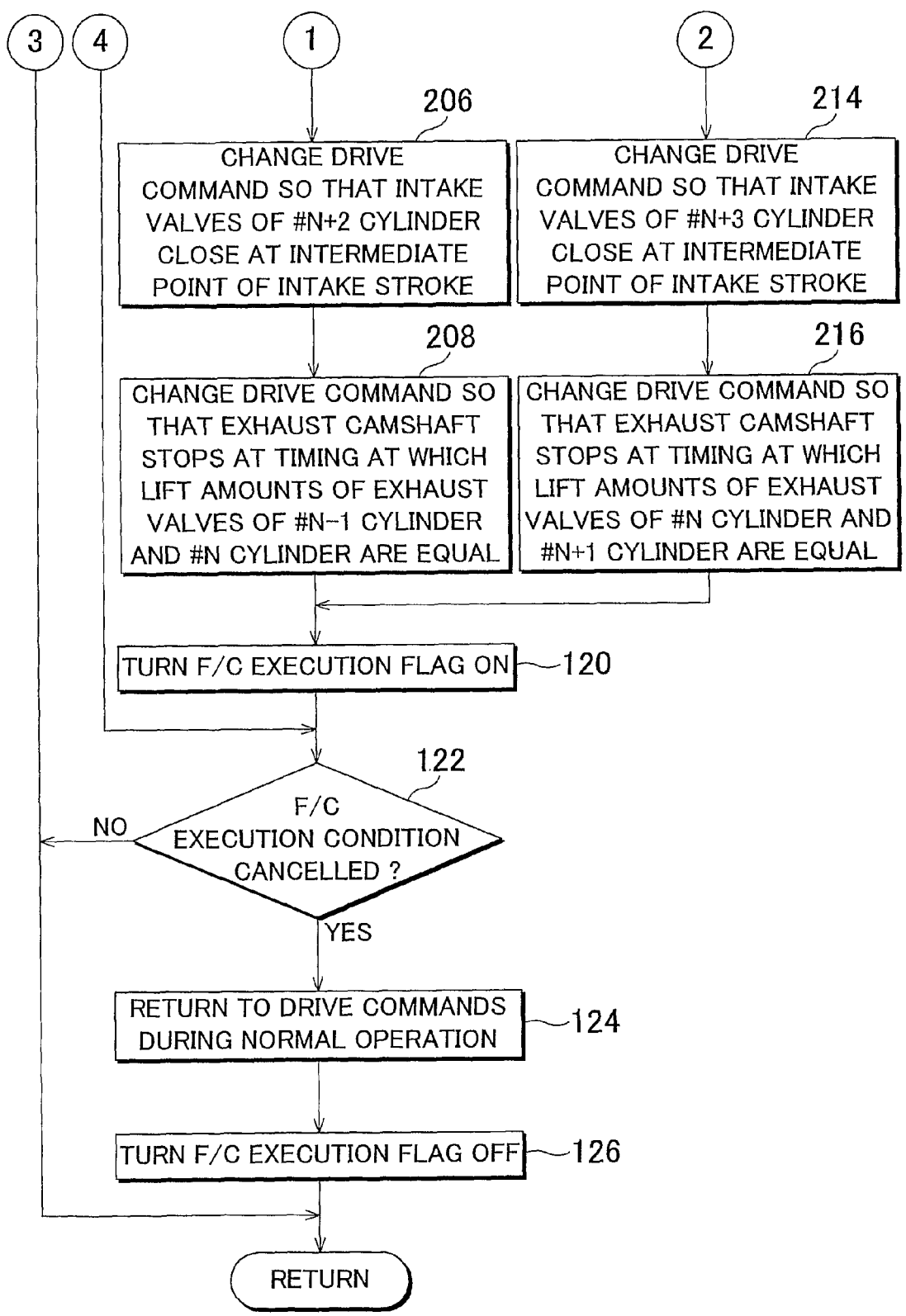

FIGS. 11A and 11B show a flow chart of a routine which is executed by the ECU 40 in this second embodiment, in order to implement the functions described above. It should be understood that, in FIGS. 11A and 11B, steps which are the same as steps shown in FIGS. 9A and 9B are designated by the same reference symbols, and their explanation will be curtailed or omitted.

In this routine shown in FIGS. 11A and 11B, after setting (in a step 104) the cylinder which first arrives at its expansion stroke after the F/C execution condition has first come into effect as the #n cylinder, in this processing cycle, a decision is made (in a step 200) as to whether or not the cylinder which has become this #n cylinder is the #1 cylinder or the #4 cylinder. If the result of this decision is that the #1 cylinder or the #4 cylinder is the #n cylinder, then the drive command for the corresponding motor is changed (in a step 202) so that the intake valves 32 of the #n cylinder and the #n+3 cylinder are kept in a closed state.

Next, the drive command for the corresponding motor is changed (in a step 204) so that the intake valves 32 of the #n+1 cylinder close at an intermediate point of the compression stroke which is currently arriving. And, next, the drive command for the corresponding motor is changed (in a step 206) so that the intake valves 32 of the #n+2 cylinder close at an intermediate point of the intake stroke which is currently arriving.

Next, the drive command for the motor 82 is changed (in a step 208) so that the exhaust camshaft 76 is stopped at a timing at which the lift amounts of the exhaust valves 36 of the #n−1 cylinder and the #n cylinder are equal to one another.

On the other hand, if in the above described step 200 it has been decided that neither the #1 cylinder nor the #4 cylinder is the #n cylinder, i.e. if it has been decided that the #n cylinder is the #2 cylinder or the #3 cylinder, then the drive command for the corresponding motor is changed (in a step 210) so that the intake valves 32 of the #n cylinder and the #n+1 cylinder are kept in the closed state.

Next, the drive command for the corresponding motor is changed (in a step 212) so that the intake valves 32 of the #n+2 cylinder close at an intermediate point of the intake stroke which first arrives after the F/C execution condition holds. And, next, the drive command for the corresponding motor is changed (in a step 214) so that the intake valves 32 of the #n+3 cylinder close at an intermediate point of the intake stroke which first arrives after the F/C execution condition holds.

Next, the drive command for the motor 82 is changed (in a step 216) so that the exhaust camshaft 76 is stopped at a timing at which the lift amounts of the exhaust valves 36 of the #n cylinder and the #n+1 cylinder are equal to one another. It should be understood that the processing of the following step 120 and subsequently is the same as in the routine shown in FIGS. 9A and 9B and described above.

According to the routine shown in FIGS. 11A and 11B and explained above, during F/C execution, gas exchange via the exhaust manifold comes to be performed by utilizing that pair of cylinders for which combustion is taking place before and after the F/C execution condition holds; or, to put it in another manner, by taking advantage of gases for which combustion has already become established. Due to this it is possible, according to the processing of the above described routine, to prevent the flowing out of air to the catalyst 26 during F/C execution more reliably, as compared with the system of the first embodiment described above.

It should be understood that, in the above described second embodiment, the "cylinder detection means" is implemented by the ECU 40 performing the processing of the above described steps 104 and 200.

Next, a third embodiment of the present invention will be explained with reference to FIGS. 12 and 13. With the system of this third embodiment, the difference from the above described first and second embodiments is that, just as with the above described intake valve operation device 34 described above, in the variable exhaust valve operation device for driving the exhaust valves 36 as well, two motors are provided for independently driving an exhaust camshaft for the #1 cylinder and the #4 cylinder, and a separate exhaust camshaft for the #2 cylinder and the #3 cylinder. It should be understood that, since the concrete structure of this third embodiment is the same as the structure shown in FIGS. 2 and 3 and described above, the detailed explanation thereof will herein be curtailed.

FIG. 12 is a figure for explanation of the opening and closing timing settings for the intake and exhaust valves 32 and 36, in this third embodiment. The settings shown in FIG. 12 have the distinguishing feature that, after the intake valves 32 of all of the cylinders have closed at intermediate points of their intake stroke or their compression stroke after the F/C execution condition has come into effect, the intake and exhaust valves 32 and 36 of all of the cylinders are kept in a closed state.

Figure 13A:
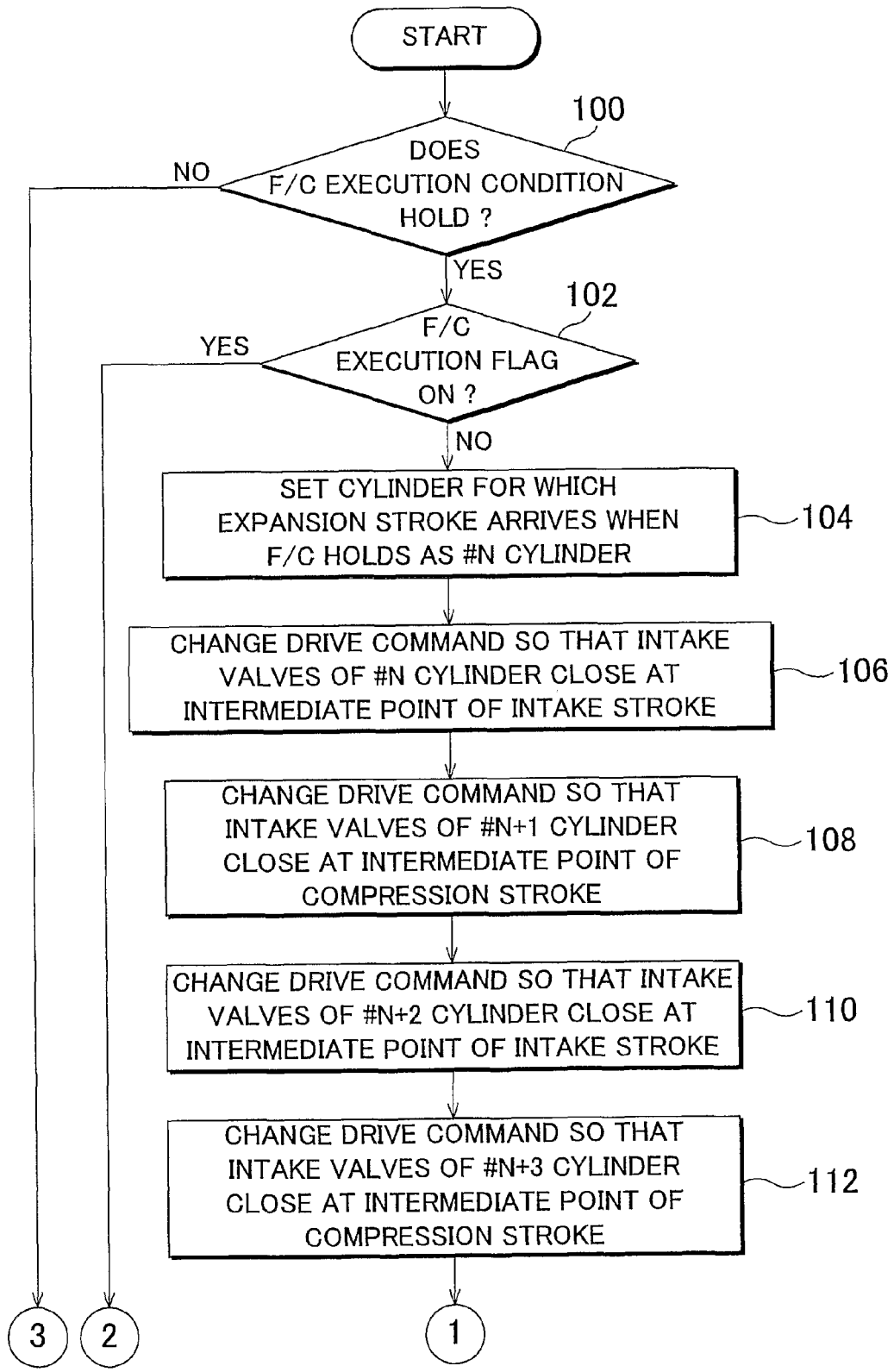
FIGS. 13A and 13B show a flow chart of a routine which is executed in the third embodiment of the present invention.
Figure 13B:
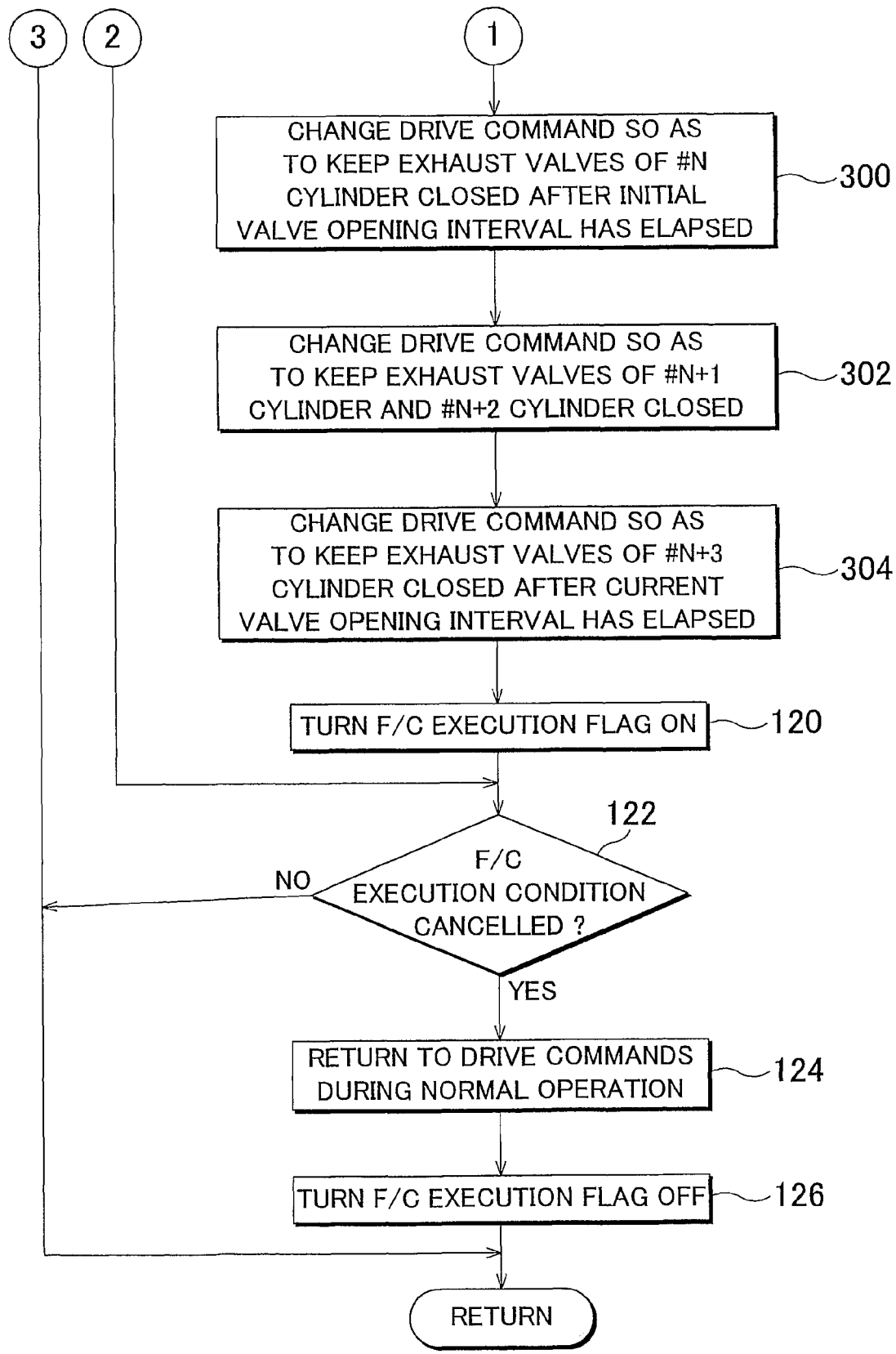

FIGS. 13A and 13B show a flow chart of a routine which is executed by the ECU 40 in this third embodiment, in order to implement the functions described above. It should be understood that, in the routine shown in FIGS. 13A and 13B, the control (in the steps 106 through 112) of the intake valves 32 for the cylinders which is performed after the #n cylinder has been set in the step 104 is the same as that performed in the routine shown in FIGS. 9A and 9B and described above. In this routine, after the processing of the above described step 112 has been performed, next, the drive command for the corresponding motor is changed (in a step 300) so that the exhaust valves 36 of the #n cylinder are kept in a closed state after the exhaust valve opening interval which first arrives after the coming into effect of the F/C execution condition has elapsed.

Next, the drive command for the corresponding motor is changed (in a step 302) so that the exhaust valves 36 of the #n+1 cylinder and the #n+2 cylinder are kept in a closed state. And, next, the drive command for the corresponding motor is changed (in a step 304) so that the exhaust valves 36 of the #n+3 cylinder are kept in a closed state after the exhaust valve opening interval which is currently arriving has elapsed. It should be understood that the processing of the following step 120 and subsequently is the same as in the routine shown in FIGS. 9A and 9B and described above.

According to the routine shown in FIGS. 13A and 13B and explained above, after the F/C execution condition has come into effect, the intake valves 32 for all of the cylinders are closed in order when the pistons 12 are at intermediate points in their intake strokes or their compression strokes. Due to this, it is possible to keep the amounts of gas charged into the combustion chambers 14 of the cylinders down to values such that the peak value of the amount of working of the crankshaft during the subsequent compression and expansion which is performed with the intake and exhaust valves 32 and 36 in their fully closed states does not become unduly high. Furthermore, it is also possible to prevent flowing out of air to the catalyst 26 during F/C execution.

Moreover, in the above described third embodiment, it is arranged to close the intake valves 32 of the cylinders in order, when the pistons 12 are at intermediate points in their intake strokes or compression strokes. With the structure of the above described third embodiment, it is possible to keep the intake and exhaust valves 32 and 36 of all of the cylinders in their closed states simultaneously. Accordingly it would also be acceptable, using the structure of this third embodiment, to arrange to close the exhaust valves 36 of the cylinders in order, in a situation in which the exhaust valves 36 are opened in a state in which the intake valves 32 are closed, such as, for example, when the pistons 12 are at intermediate points of their exhaust strokes, so as to ensure that the peak value of the amount of working of the crankshaft during the compression and expansion which is performed with the intake and exhaust valves 32 and 36 in their fully closed states does not become unduly high.

Next, a fourth embodiment of the present invention will be explained with reference to FIG. 14. The system of this fourth embodiment may be implemented by using the hardware structure shown in FIGS. 1 through 5 above, while executing, in the ECU 40, the routine shown in FIG. 14 and described below, instead of the routine shown in FIGS. 9A and 9B.

Herein, the gas temperature in the internal combustion engine 10, when the pistons 12 are at their compression top dead centers in the state in which the intake and exhaust valves 32 and 36 are fully closed within the cylinders, will be referred to as "compression temperature". For satisfactorily starting the internal combustion engine 10, there exists an appropriate temperature region for this compression temperature. In more concrete terms, HC (white smoke) can easily be generated during cool starting, since the compression temperature is in a region which is lower than the appropriate temperature region. Furthermore if, during warm starting, the compression temperature is in a region which is higher than the appropriate temperature region, then the mixture gas can easily self-ignite before spark ignition is performed; in other words, it becomes easy for knocking to occur.

Thus, with the system of this fourth embodiment, during cool starting, in order to suppress the generation of HC, it is arranged to commence the starting operation from a cylinder for which the intake and exhaust valves 32 and 36 are put into the fully closed state. Furthermore, during warm starting, in order to prevent the occurrence of knocking, it is arranged to commence the starting operation from a cylinder for which the exhaust valves 36 are put into an open state.

Figure 14:
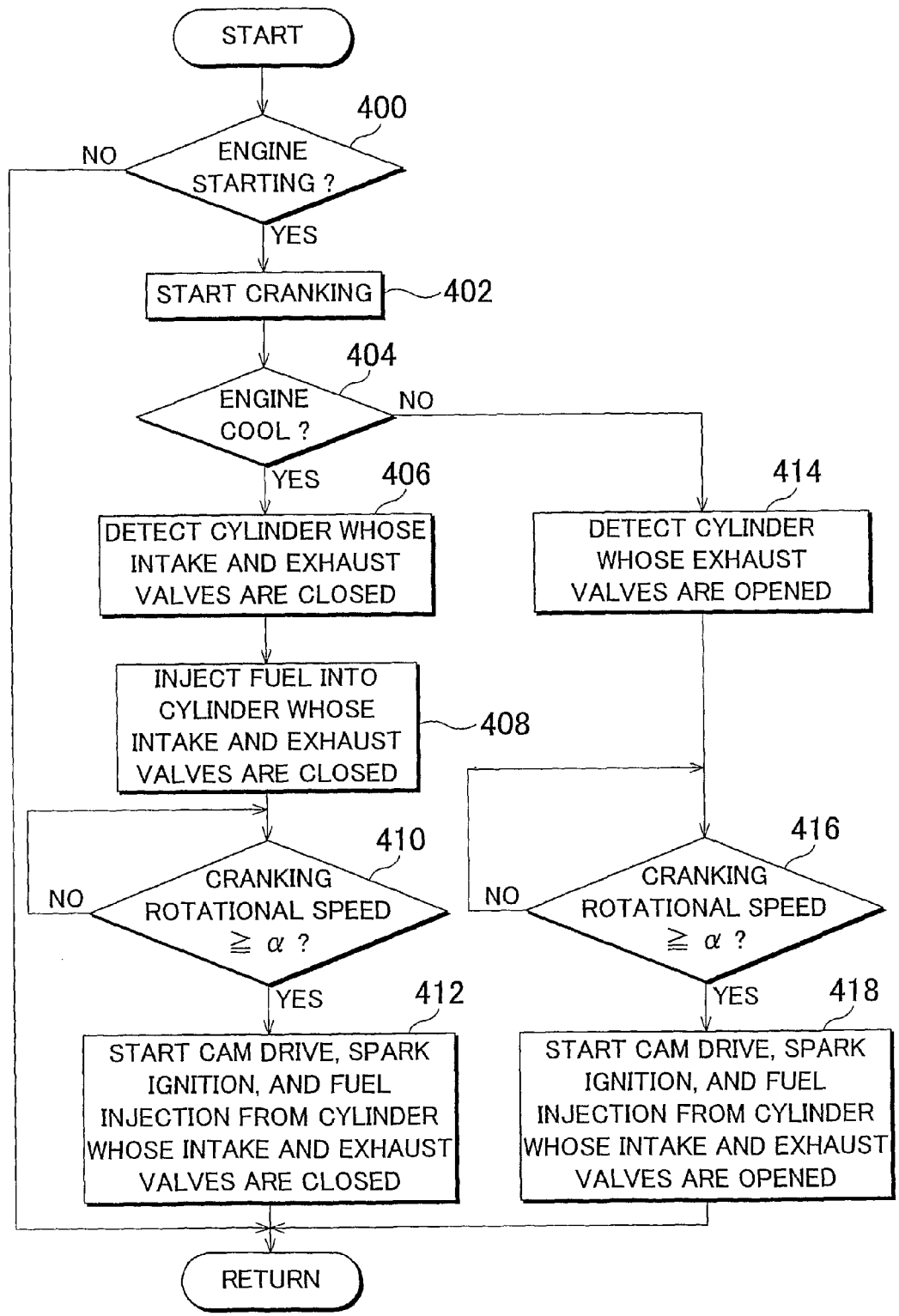
FIG. 14 is a flow chart of a routine which is executed in the fourth embodiment of the present invention.

FIG. 14 is a flow chart of a routine which is executed by the ECU 40 in this fourth embodiment, in order to implement the functions described above. In the routine shown in FIG. 14, first, a decision is made (in a step 400) as to whether or not a command has been issued to start the internal combustion engine 10. In concrete terms, this type of starting command is issued if the driver of the vehicle has actuated the ignition switch, or if, with a hybrid vehicle, a request has been issued from the vehicle during EV running operation.

If a starting command has been detected in the above described step 400, then cranking of the internal combustion engine 10 is started (in a step 402). Next, a decision is made (in a step 404) as to whether or not the current state of the internal combustion engine 10 is the cool state. In concrete terms, for example, based on information such as the cooling water temperature of the internal combustion engine 10, it is decided that the internal combustion engine 10 is in the cool state if the temperature of its cooling water is less than or equal to a predetermined temperature, while, conversely, it is decided that the internal combustion engine 10 is in the warm state if the temperature of its cooling water is higher than said predetermined temperature.

If, in the above described step 404, it has been decided that the internal combustion engine 10 is currently in the cool state, then a cylinder is detected (in a step 406) whose intake and exhaust valves 32 and 36 are in the fully closed state at this time point. This decision in this step 404 may be performed by detecting the rotational positions of the intake camshafts 52 and 54 or of the exhaust camshaft 76, based on the output of a cam angle sensor which is provided to the internal combustion engine 10.

Next, fuel injection is performed (in a step 408) for this cylinder for which it has been detected, by the processing of the step 406 as described above, that the intake and exhaust valves 32 and 36 are in the fully closed state. As described above, in the system of this fourth embodiment, a fuel injection valve 28 is provided which is capable of injecting fuel directly into the cylinder. In this step 408, an amount of fuel which is required when performing initial combustion is injected in advance into the combustion chamber 14 by the fuel injection valve 28 which is provided to the above described fully closed cylinder.

Next, a decision is made (in a step 410) as to whether or not the current cranking rotational speed is greater than or equal to a predetermined value a for permitting engine starting. If the result of this decision is that the current cranking rotational speed has arrived at the predetermined value a, then, along with the driving of the camshafts by the intake valve operation device 34 and the exhaust valve operation device 38 being started, fuel injection and spark ignition are started (in a step 412) at a predetermined timing, from the cylinder for which it was detected, by the processing of the above described step 406, that the intake and exhaust valves 32 and 36 are in the fully closed state.

On the other hand if, in the above described step 404, it has been decided that the internal combustion engine 10 is not currently in the cool state, in other words if it has been decided that it is in the warm state, then a cylinder is detected (in a step 414) of which the exhaust valves 36 are in an open state at this time point.

Next, a decision is made (in a step 416) as to whether or not the current cranking rotational speed is greater than or equal to the predetermined value a. If the result of this decision is that the current cranking rotational speed has arrived at the predetermined value a, then, along with the driving of the camshafts by the intake valve operation device 34 and the exhaust valve operation device 38 being started, fuel injection and spark ignition are started (in a step 418) at a predetermined timing, from the cylinder for which it was detected, by the processing of the above described step 414, that the exhaust valves 36 are in an open state.

In the cylinders for which, during cranking, the intake and exhaust valves 32 and 36 are both in the fully closed state, the compression temperature is elevated by the compression and expansion being repeated. According to the routine shown in FIG. 14 and explained above, when the internal combustion engine 10 is in the cool state, since the starting is commenced from a cylinder for which the compression temperature has been elevated to an appropriate temperature, accordingly it is possible to ensure good starting performance, while effectively suppressing the generation of HC. Furthermore, with the above described routine, when the internal combustion engine 10 is in the cool state, during cranking, fuel injection is performed in advance for the cylinders for which the intake and the exhaust valves 32 and 36 are in the fully closed state. Due to this, it is possible to commence the starting procedure in a state in which the fuel within the combustion chamber 14 is sufficiently well mixed with air, due to repeated compression and expansion, and it accordingly becomes possible to ensure more satisfactory starting performance.

Furthermore by, according to the above described routine, when the internal combustion engine is in the warm state, commencing engine starting from a cylinder for which the exhaust valve 36 is in an open state, thereby, when commencing starting, it is possible to avoid the compression temperature exceeding the appropriate temperature region, so that it is possible to prevent the occurrence of knocking.

By the way, in the above described fourth embodiment, it is arranged, when the starting command for the internal combustion engine 10 has been issued, to detect a cylinder of which the intake and exhaust valves 32 and 36 are all in the fully closed state, or a cylinder of which the exhaust valve 36 is in the open state. However a system like the one of this fourth embodiment, which includes an intake valve operation device 34 and a variable exhaust valve operation device 38 which can drive the intake and exhaust valves 32 and 36 independently of the rotation of the crankshaft, is not limited to this type of technique. For example it would also be acceptable to arrange, when the starting command for the internal combustion engine 10 has been issued, to select any desired cylinder, intentionally to put the intake valves 32 and the exhaust valves 36 of this cylinder which has thus been selected into the fully closed state, or alternatively to put its exhaust valves 36 into an open state, and then to commence starting from this cylinder in this state.

Furthermore, with the above described fourth embodiment, when the internal combustion engine 10 is in the warm state, the starting is commenced from a cylinder for which it has been detected that the exhaust valves 36 are in an open state; but the present invention is not to be considered as being limited to this type of technique. For example it would also be acceptable, when the internal combustion engine 10 is in the warm state, during engine cranking, to change over alternatingly between cylinders for which the exhaust valves 36 are in an open state. According to this type of technique, when the internal combustion engine is in the warm state, only a portion of the cylinders are put into a state in which their intake and exhaust valves 32 and 36 are in the fully closed state; and thereby, during engine cranking, it is possible to avoid the compression temperature undesirably becoming too high, and it is possible to average out the compression temperatures of all of the cylinders during engine starting.

Moreover although, in the above described fourth embodiment, the above described control is performed when a command for starting the internal combustion engine 10 has been issued, the situation in which the combustion start request of the present invention is issued is not limited to being upon the occasion of this type of engine starting command; it would also be acceptable for the combustion start request of the present invention to be, for example, a request for return from F/C, which is detected during F/C execution. In other words, it would also be acceptable to arrange for the control of this fourth embodiment according to the routine shown in FIG. 14 to be performed at the time of a request for return from F/C, when fuel injection is to be restarted. Furthermore, it would also be acceptable to arrange for control according to the routine shown in FIG. 14 and described above to be performed when a request for return from F/C has been detected, in a system in which the intake and exhaust valves 32 and 36 are being controlled with the settings shown in the above described FIG. 6 or FIG. 10, by intentionally operating the intake valve operation device 34 and the exhaust valve operation device 38 during F/C execution, as in the above described first or second embodiments.

It should be understood that, in the above described fourth embodiment, the "engine temperature detection means" is implemented by the ECU 40 performing the processing of the above described step 404, the "combustion request detection means" is implemented by the ECU 40 performing the processing of the above described step 400, the "warm combustion execution means" is implemented by the ECU 40 performing the processing of the above described steps 404 and 414 through 418, and the "cool combustion execution means" is implemented by the ECU 40 performing the processing of the above described steps 404 through 412. Furthermore, the "fuel pre-injection means" is implemented by the ECU 40 performing the processing of the above described step 408, and the "ignition prevention means" is implemented by, in the above described step 410, arranging not to perform ignition until the cranking rotational speed reaches the predetermined value a.

Furthermore although, in the above described first through fourth embodiments, as the devices for operating the intake and exhaust valves 32 and 36, the intake valve operation device 34 and so on which directly drives the camshaft with a motor is employed, the variable valve operation device which can be applied to the present invention is not limited to having the above described structure. In other words, it would also be acceptable to utilize some other type of variable valve operation device, provided that it was compatible with the particular distinguishing features of the above described embodiments. In concrete terms, instead of the above described variable valve operation device, it would also be acceptable to utilize an electromagnetic valve drive device which drives, by electromagnetic force, a valve which functions as an intake valve or as an exhaust valve. Furthermore, it would also be acceptable to utilize a mechanical type variable valve operation device which incorporates a mechanism for mechanically changing the opening characteristics of an intake valve or an exhaust valve. Yet further it would also be acceptable to provide, as a cam which presses upon and operates an intake valve or an exhaust valve, a cam which has a plurality of profiles which change in succession, and to utilize a variable valve operation device which is capable of changing the valve opening characteristics by shifting this cam along the axial direction of the camshaft.

Although in the above description the present invention has been explained in terms of various embodiments and variant examples thereof, the present invention is not to be considered as being limited by the above described embodiments; it would be possible to implement the present invention in various different ways, provided that no departure is made from its scope. For example, although the above described first through fourth embodiments have been explained, for convenience of description, in terms of the example of a four cylinder in-line engine, the internal combustion engine to which the present invention is applied is not limited to being an engine of such a type.

The invention claimed is:

1. A method for controlling an internal combustion engine which performs fuel cut-off for a plurality of cylinders when a fuel cut-off execution condition has come into effect, comprising the steps of:

controlling an intake valve, so as to keep in a closed state the intake valve of a cylinder for which an exhaust valve is not kept in the closed state, when the fuel cut-off execution condition has come into effect, and controlling an exhaust valve, so as to keep in the closed state the exhaust valve of at least a pair of cylinders which were not in their intake stroke or compression stroke when the fuel cut-off execution condition came into effect, after an initial valve opening interval for the exhaust valve.

2. The method according to claim 1, wherein
a variable exhaust valve device keeps the exhaust valves of all of the cylinders other than the at least a pair of cylinders, in the closed state, when the fuel cut-off execution condition has come into effect.

3. The method according to claim 1, wherein
a variable intake valve device keeps the intake valves of all of the cylinders of the engine in the closed state, when the fuel cut-off execution condition has come into effect.

4. The method according to claim 1, wherein
a variable exhaust valve device is used in common for a plurality of cylinders, and includes an exhaust camshaft which includes exhaust cams which put the exhaust valves of the at least a pair of cylinders in the closed state, and a drive apparatus which drives the exhaust camshaft; and wherein
the drive apparatus is capable of stopping the exhaust camshaft in a state in which the exhaust valves of the at least a pair of cylinders are in the closed state.

5. The method according to claim 1, wherein for at least one cylinder whose intake and exhaust valves are fully closed during the fuel cut-off, the intake valve control device or the exhaust valve control device closes one of the intake valve and the exhaust valve of the cylinder which is not closed, when the piston for the cylinder is at an approximately intermediate position between its top dead center and its bottom dead center.

6. The method according to claim 1, wherein
an exhaust valve control device includes a cylinder detection device which detects at least a pair of cylinders which are not in their intake stroke or compression stroke, at the time point at which the fuel cut-off execution condition has come into effect; and wherein
the exhaust valve control device controls the variable exhaust valve device, so as to keep in the open state an exhaust valve of each of the at least a pair of cylinders which have been detected.

7. The method according to claim 1, further comprising:
providing an engine temperature detection device which detects the temperature state of the internal combustion engine; providing a start request detection device which detects a start request for starting the internal combustion engine in a warm state; and providing a warm-start device which starts combustion from a cylinder for an exhaust valve of which is in the open state, when the start request is detected during the internal combustion engine being in the warm state.

8. The method according claim 1, further comprising:
providing a cool-start device which starts combustion from a cylinder for both an intake valve of which and providing an exhaust valve of which are in the closed state, when the start request is detected during the internal combustion engine being in a cool state.

9. The method according to claim 1, further comprising:
providing a fuel injection valve which injects fuel directly into a combustion chamber of the internal combustion engine; providing a fuel pre-injection device which controls the fuel injection valve, so as to inject fuel in advance into the cylinder for which both an intake valve and an exhaust valve are in the closed state, at a time point before the cool-start device starts the internal combustion engine; and providing an ignition prevention device which prevents ignition in the cylinder for which both an intake valve and an exhaust valve are in the closed state, until the cool-start device starts the internal combustion engine.

10. The method according to claim 1, wherein
an exhaust valve control device controls the variable exhaust valve device, so as to keep the exhaust valves of all of the cylinders in the closed state, after a predetermined time period has elapsed from when the fuel cut-off execution condition came into effect.

* * * * *